United States Patent
Deshpande et al.

(10) Patent No.: US 6,591,348 B1
(45) Date of Patent: Jul. 8, 2003

(54) METHOD AND SYSTEM FOR RESOLUTION OF TRANSACTION COLLISIONS TO ACHIEVE GLOBAL COHERENCE IN A DISTRIBUTED SYMMETRIC MULTIPROCESSOR SYSTEM

(75) Inventors: Sanjay Raghunath Deshpande, Austin, TX (US); Tina Shui Wan Chan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,833

(22) Filed: Sep. 9, 1999

(51) Int. Cl.$^7$ ............................................... G06F 12/00

(52) U.S. Cl. .................. 711/141; 711/150; 711/168

(58) Field of Search .................. 711/141, 150, 711/152, 167, 168, 170; 712/28; 710/260; 714/800

(56) References Cited

U.S. PATENT DOCUMENTS

| | | | |
|---|---|---|---|
| 4,152,764 A | 5/1979 | Connors et al. | 364/200 |
| 4,484,270 A | 11/1984 | Quernemoen et al. | 364/200 |
| 4,862,354 A | 8/1989 | Fiacconi et al. | 364/200 |
| 5,208,914 A | 5/1993 | Wilson et al. | 395/275 |
| 5,325,503 A | 6/1994 | Stevens et al. | 395/425 |
| 5,327,570 A | 7/1994 | Foster et al. | 395/800 |
| 5,335,335 A | 8/1994 | Jackson et al. | 395/425 |
| 5,426,765 A | 6/1995 | Stevens et al. | 395/425 |
| 5,440,752 A | 8/1995 | Lentz et al. | 395/800 |
| 5,566,342 A | 10/1996 | Denneau et al. | 395/800 |
| 5,577,204 A | 11/1996 | Brewer et al. | 395/200 |
| 5,649,106 A | 7/1997 | Tsujimichi et al. | 395/200 |
| 5,696,913 A | 12/1997 | Gove et al. | 395/311 |
| 5,708,792 A | 1/1998 | Hayes et al. | 395/435 |
| 5,715,430 A | 2/1998 | Hirayama | 395/468 |
| 5,754,877 A | 5/1998 | Hagersten et al. | 395/800 |
| 5,768,609 A | 6/1998 | Gove et al. | 395/800 |
| 5,784,394 A * | 7/1998 | Alvarez, II et al. | 714/800 |

(List continued on next page.)

FOREIGN PATENT DOCUMENTS

| | | | |
|---|---|---|---|
| EP | 911731 A2 | 4/1999 | G06F/9/46 |
| EP | 911736 A1 | 4/1999 | G06F/12/08 |

OTHER PUBLICATIONS

Non–Blocking Distributed Bus Switch For Multicomputer Systems, Research Disclosure Jul. 1998 pp. 1003–1004.

*Primary Examiner*—David Hudspeth
*Assistant Examiner*—Fred F. Tzeng
(74) *Attorney, Agent, or Firm*—Duke W. Yee; Mark E. McBurney; Stephen R. Tkacs

(57) ABSTRACT

A distributed system structure for a large-way, symmetric multiprocessor system using a bus-based cache-coherence protocol is provided. The distributed system structure contains an address switch, multiple memory subsystems, and multiple master devices, either processors, I/O agents, or coherent memory adapters, organized into a set of nodes supported by a node controller. The node controller receives commands from a master device, communicates with a master device as another master device or as a slave device, and queues commands received from a master device. The node controller has a deterministic delay between latching a snooped command broadcast by the address switch and presenting the command to the master devices on the node controller's master device buses. Since the achievement of coherency is distributed in time and space, the node controller helps to maintain cache coherency for commands by contributing one or more inputs into a determination of a coherency response for commands based on the types of commands and the phases of commands queued within the node controller. A response combination block logically combines, generates, and then transmits command status signals and command response signals associated with commands issued by master devices. The system is able to achieve the correct order of complete for transactions using these coherency inputs.

25 Claims, 13 Drawing Sheets

U.S. PATENT DOCUMENTS

| | | | | |
|---|---|---|---|---|
| 5,794,062 A | | 8/1998 | Baxter | 395/800 |
| 5,815,680 A | | 9/1998 | Okumura et al. | 395/311 |
| 5,859,975 A | | 1/1999 | Brewer et al. | 395/200 |
| 5,890,007 A | | 3/1999 | Zinguuzi | 395/800 |
| 5,895,495 A | | 4/1999 | Arimilli et al. | 711/156 |
| 5,931,938 A | | 8/1999 | Drogichen et al. | 712/15 |
| 6,067,603 A | * | 5/2000 | Carpenter et al. | 711/141 |
| 6,067,611 A | * | 5/2000 | Carpenter et al. | 712/28 |
| 6,081,874 A | * | 6/2000 | Carpenter et al. | 711/141 |
| 6,085,293 A | * | 7/2000 | Carpenter et al. | 711/141 |
| 6,108,764 A | * | 8/2000 | Baumgartner et al. | 712/28 |
| 6,115,804 A | * | 9/2000 | Carpenter et al. | 712/28 |
| 6,148,361 A | * | 11/2000 | Carpenter et al. | 710/260 |
| 6,192,452 B1 | * | 2/2001 | Bannister et al. | 711/141 |
| 6,209,065 B1 | * | 3/2001 | Van Doren et al. | 711/150 |
| 6,226,718 B1 | * | 5/2001 | Carpenter et al. | 711/152 |

* cited by examiner

PHASES OF A TRANSACTION

| PHASE | NUMBER OF CYCLES | PHASE START | PHASE END | LOCATION/ACTION |
|---|---|---|---|---|
| 1a | 1 | First cycle within the system | First cycle within the system | Boundary latch IN_BL |
| 1b | Depends on type of transaction | Second cycle within the system | Last cycle for Primary ARespOut for transaction | Queued in node controller |
| 2a | Indeterminate | Cycle after Phase 1b has expired | Cycle before transaction received in FROM_ASX_BL | Queued in node controller and selected for global snoop |
| 2b | 1 | Cycle while transaction resides in FROM_ASX_BL | Cycle while transaction resides in FROM_ASX_BL | Boundary latch FROM_ASX_BL during broadcast for global snoop |
| 3 | Fixed number of cycles | Cycle after Phase 2b has expired | Global ARespIn for the transaction detected by the node controller | Broadcast to master devices for global snoop |
| 4 | Depends on type of transaction | Cycle after Phase 3 has expired | Read transactions— Cycle before data transfer begins to the requestor<br>---<br>Non-read transactions— Completion of transaction with respect to the system | Execution of transaction |
| 5 | Depends on type of Read transaction and amount of data to be transferred | Cycle after Phase 4 has expired | Completion of transaction with respect to the system | Execution of transaction |

*FIG. 11*

| DClaim Phase: | 1a | 1b | 2a | 2b | 3 | 4 |
|---|---|---|---|---|---|---|
| DClaim (Local) | Primary AStat=Retry Primary AResp=X | Primary AStat=X Primary AResp=Retry | Global AStat=X Global AResp=Retry | - - - - | Global AStat=X Global AResp=X | Global AStat=X Global AResp=Retry |
| Read (Snooped) | Global AStat=X Global AResp=X | Global AStat=X Global AResp=X | Global AStat=X Global AResp=Retry | - - - - | Global AStat=X Global AResp=Retry | Global AStat=X Global AResp=Retry |

FIG. 12A

| Read Phase: | 1a | 1b | 2a | 2b | 3 | 4 |
|---|---|---|---|---|---|---|
| Read (Local) | Primary AStat=Retry Primary AResp=X | Primary AStat=X Primary AResp=Retry | Global AStat=X Global AResp=X | - - - - | Global AStat=X Global AResp=X | Global AStat=X Global AResp=Retry |
| DClaim (Snooped) | Global AStat=X Global AResp=X | Global AStat=X Global AResp=X | Global AStat=X Global AResp=Retry | - - - - | Global AStat=X Global AResp=Retry | Global AStat=X Global AResp=Retry |

FIG. 12B

METHOD AND SYSTEM FOR RESOLUTION OF TRANSACTION COLLISIONS TO ACHIEVE GLOBAL COHERENCE IN A DISTRIBUTED SYMMETRIC MULTIPROCESSOR SYSTEM

CROSS REFERENCE TO RELATED APPLICATIONS

The present invention is related to the following applications entitled "METHOD AND APPARATUS FOR PROVIDING GLOBAL COHERENCE IN A LARGE-WAY, HIGH PERFORMANCE SMP SYSTEM", U.S. application Ser. No. 09/350,032, filed on Sep. 9, 1999; "METHOD AND APPARATUS FOR ACHIEVING CORRECT ORDER AMONG BUS MEMORY TRANSACTIONS IN A PHYSICALLY DISTRIBUTED SMP SYSTEM", U.S. application Ser. No. 09/350,030, filed on Sep. 9, 1999; "METHOD AND APPARATUS USING A DISTRIBUTED SYSTEM STRUCTURE TO SUPPORT BUS-BASED CACHE-COHERENCE PROTOCOLS FOR SYMMETRIC MULTIPROCESSORS", U.S. application Ser. No. 09/350,031, filed on Sep. 9, 1999; "METHOD AND SYSTEM FOR IMPLEMENTING REMSTAT PROTOCOL UNDER INCLUSION AND NON-INCLUSION OF L1 DATA IN L2 CACHE TO PREVENT READ-READ DEADLOCK", U.S. application Ser. No. 09/404,400, filed on Sep. 23, 1999; and "METHOD AND SYSTEM FOR CONTROLLING DATA TRANSFERS WITH PHYSICAL SEPARATION OF DATA FUNCTIONALITY FROM ADDRESS AND CONTROL FUNCTIONALITY IN A DISTRIBUTED MULTI-BUS MULTIPROCESSOR SYSTEM", U.S. application Ser. No. 09/404,280, filed on Sep. 23, 1998; assigned to the same assignee.

BACKGROUND OF THE INVENTION

1. Technical Field

The present invention relates generally to an improved data processing system and, in particular, to a method and system for improving data throughput within a data processing system. Specifically, the present invention relates to a method and system for improving performance of storage access and control using cache-coherence.

2. Description of Related Art

Traditionally, symmetric multiprocessors are designed around a common system bus on which all processors and other devices such as memory and I/O are connected by merely making physical contacts to the wires carrying bus signals. This common bus is the pathway for transferring commands and data between devices and also for achieving coherence among the system's cache and memory. A single-common-bus design remains a popular choice for multiprocessor connectivity because of the simplicity of system organization.

This organization also simplifies the task of achieving coherence among the system's caches. A command issued by a device gets broadcast to all other system devices simultaneously and in the same clock cycle that the command is placed on the bus. A bus enforces a fixed ordering on all commands placed on it. This order is agreed upon by all devices in the system since they all observe the same commands. The devices can also agree, without special effort, on the final effect of a sequence of commands. This is a major advantage for a single-bus-based multiprocessor.

A single-common-bus design, however, limits the size of the system unless one opts for lower system performance. The limits of technology typically allow only a few devices to be connected on the bus without compromising the speed at which the bus switches and, therefore, the speed at which the system runs. If more master devices, such as processors and I/O agents, are placed on the bus, the bus must switch at slower speeds, which lowers its available bandwidth. Lower bandwidth may increase queuing delays, which result in lowering the utilization of processors and lowering the system performance.

Another serious shortcoming in a single-bus system is the availability of a single data path for transfer of data. This further aggravates queuing delays and contributes to lowering of system performance.

Two broad classes of cache-coherence protocols exist. One is bus-based snooping protocols, wherein all the caches in the system connect to a common bus and snoop on transactions issued on the common bus by other caches and then take appropriate actions to stay mutually coherent. The other class is directory-based protocols, wherein each memory address has a "home" site. Whenever a cache accesses that address, a "directory" at the home site is updated to store the cache's identity and the state of the data in it. When it is necessary to update the state of the data in that cache, the home site explicitly sends a message to the cache asking it to take appropriate action.

In terms of implementation and verification complexity, the bus-based snooping protocol is significantly simpler than the directory-based protocol and is the protocol of choice of symmetric multiprocessor (SMP) systems. However, the bus-based snooping protocol is effectively employed in a system with only a small number of processors, usually 2 to 4.

Thus, although a single-system-bus design is the current design choice of preference for implementing coherence protocol, it cannot be employed for a large-way SMP with many processors.

Therefore, it would be advantageous to have a large-way SMP design using bus-based cache-coherence protocols.

SUMMARY OF THE INVENTION

A distributed system structure for a large-way, symmetric multiprocessor system using a bus-based cache-coherence protocol is provided. The distributed system structure contains an address switch, multiple memory subsystems, and multiple master devices, either processors, I/O agents, or coherent memory adapters, organized into a set of nodes supported by a node controller. The node controller receives commands from a master device, communicates with a master device as another master device or as a slave device, and queues commands received from a master device. The node controller has a deterministic delay between latching a snooped command broadcast by the address switch and presenting the command to the master devices on the node controller's master device buses. Since the achievement of coherency is distributed in time and space, the node controller helps to maintain cache coherency for commands by contributing one or more inputs into a determination of a coherency response for commands based on the types of commands and the phases of commands queued within the node controller. A response combination block logically combines, generates, and then transmits command status signals and command response signals associated with commands issued by master devices. The system is able to achieve the correct order of complete for transactions using these coherency inputs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a table showing the definition of phases of a transaction within the present system; and FIGS. 12A–12B are tables depicting responses generated by a node controller in response to the detection of a colliding pair of transactions.

DETAILED DESCRIPTION OF THE PREFERRED EMBODIMENT

Figure 1:
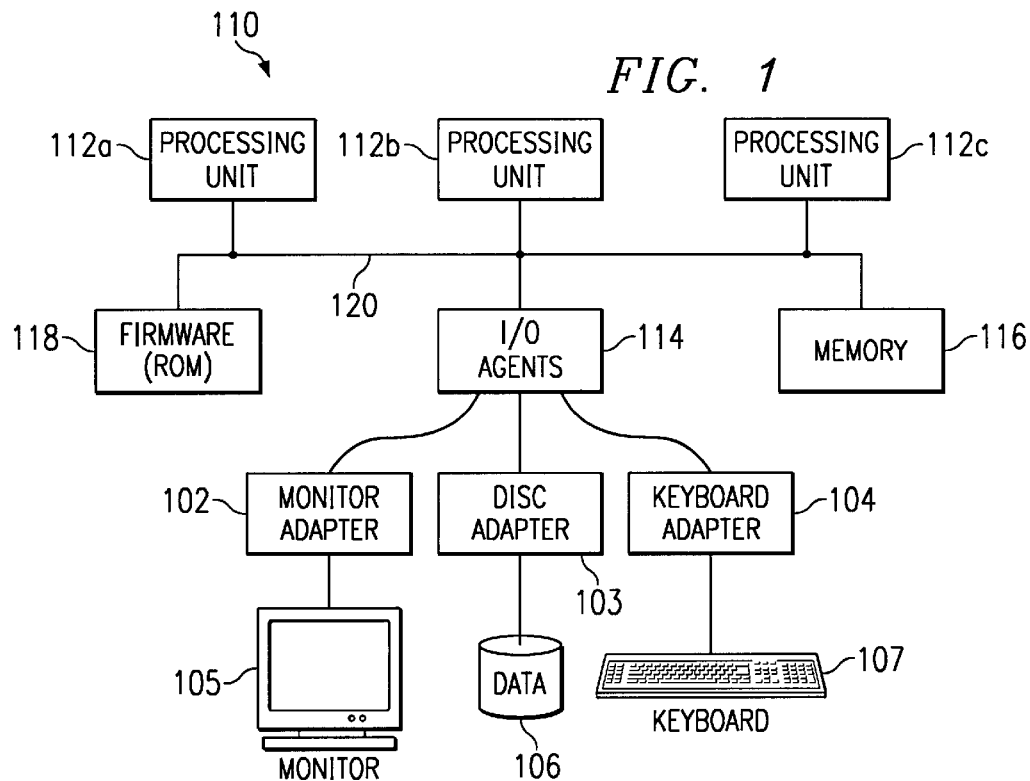
FIG. 1 is a block diagram depicting the basic structure of a conventional multiprocessor computer system.

With reference now to FIG. 1, the basic structure of a conventional multiprocessor computer system 110 is depicted. Computer system 110 has several processing units 112a, 112b, and 112c which are connected to various peripheral devices, including input/output (I/O) agents 114, which accept data from and provide data to a monitor adapter 102 and display monitor 105, keyboard adapter 104 and keyboard 107, and disk adapter 103 and permanent storage device 106, memory device 116 (such as dynamic random access memory or DRAM) that is used by the processing units to carry out program instructions, and firmware 118 whose primary purpose is to seek out and load an operating system from one of the peripherals (usually the permanent memory device) whenever the computer is first turned on. Processing units 112a–112c communicate with the peripheral devices by various means, including a bus 120. Computer system 110 may have many additional components which are not shown, such as serial and parallel ports for connection to peripheral devices, such as modems or printers. Those skilled in the art will further appreciate that there are other components that might be used in conjunction with those shown in the block diagram of FIG. 1; for example, a display adapter might be used to control a video display monitor, a memory controller can be used to access memory 116, etc. In addition, computer system 110 may be configured with more or fewer processors.

In a symmetric multiprocessor (SMP) computer, all of the processing units 112a–112c are generally identical; that is, they all use a common set or subset of instructions and protocols to operate and generally have the same architecture.

Figure 2:
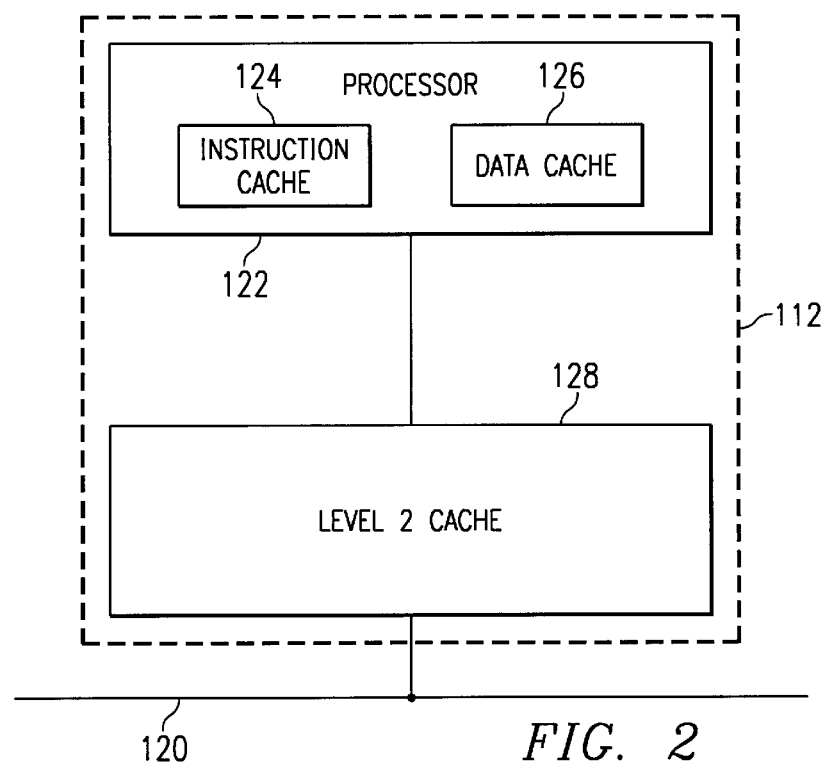
FIG. 2 is a block diagram depicting a typical architecture.

With reference now to FIG. 2, a typical organization is depicted. A processing unit 112 includes a processor 122 having a plurality of registers and execution units, which carry out program instructions in order to operate the computer. The processor can also have caches, such as an instruction cache 124 and a data cache 126. These caches are referred to as "on-board" when they are integrally packaged with the processor's registers and execution units. Caches are commonly used to temporarily store values that might be repeatedly accessed by a processor, in order to speed up processing by avoiding the longer step of loading the values from memory, such as memory 116 shown in FIG. 1.

Processing unit 112 can include additional caches, such as cache 128. Cache 128 is referred to as a level 2 (L2) cache since it supports the on-board (level 1) caches 124 and 126. In other words, cache 128 acts as an intermediary between memory 116 and the on-board caches, and can store a much larger amount of information (instructions and data) than the on-board caches, although at a longer access penalty. For example, cache 128 may be a chip having a storage capacity of 256 or 512 kilobytes, while the processor 112 may be an IBM PowerPC™ 604-series processor having on-board caches with 64 kilobytes of total storage. Cache 128 is connected to bus 120, and all loading of information from memory 116 into processor 112 must come through cache 128. Although FIG. 2 depicts only a two-level cache hierarchy, multi-level cache hierarchies can be provided where there are many levels of serially connected caches.

In an SMP computer, it is important to provide a coherent memory system, that is, to cause writes to each individual memory location to be serialized in some order for all processors. For example, assume a location in memory is modified by a sequence of writes to take on the values 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that ensures that each processor obtains valid data order is said to be "coherent." It is important to note that virtually all coherency protocols operate only to the granularity of the size of a cache block. That is to say, the coherency protocol controls the movement of the write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to perform the write command. The key issue is that all other processors in the system must be informed of the write command by the initiating processor before the write occurs. To further illustrate how cache coherence is implemented in multi-level hierarchies, consider FIG. 3.

Figure 3:
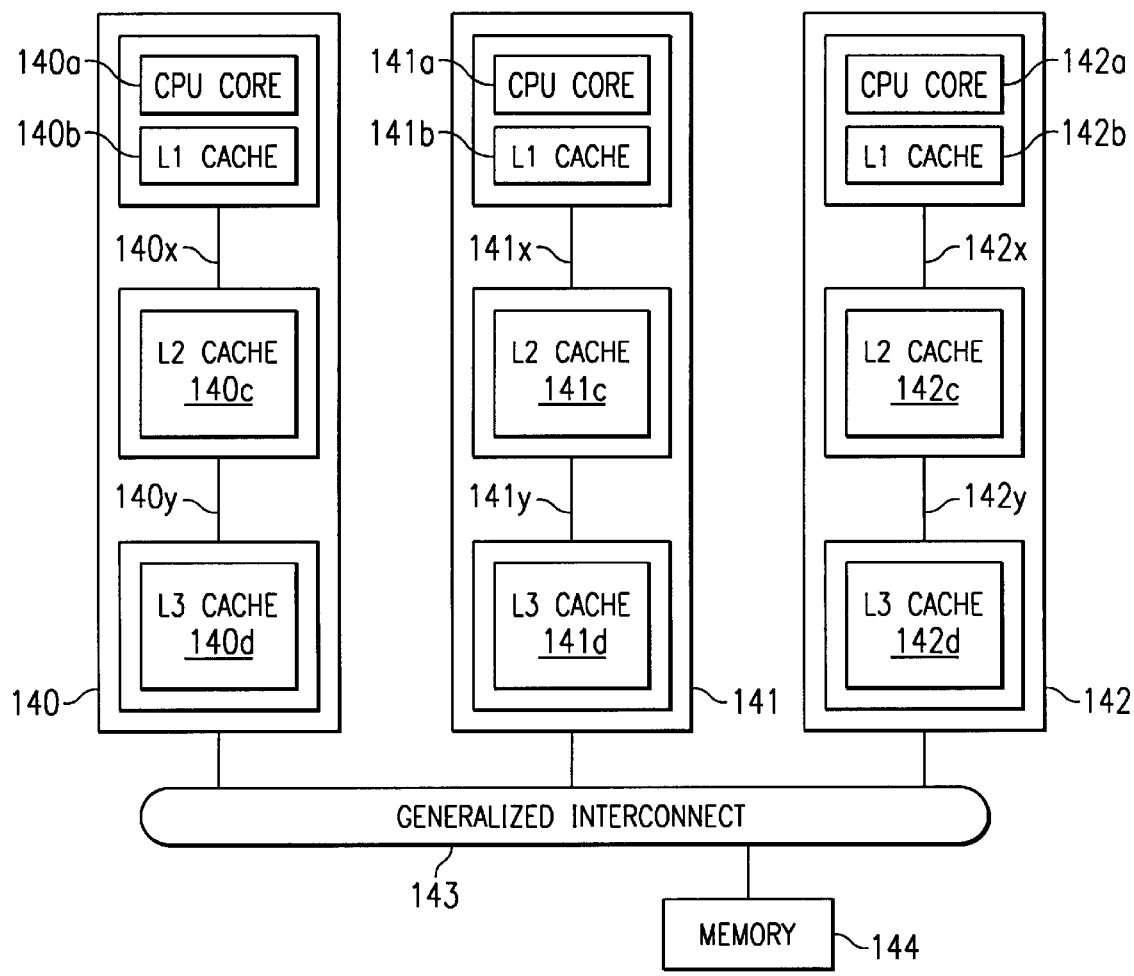
FIG. 3 is a block diagram depicting an SMP computer system with three processing units.

With reference now to FIG. 3, an SMP computer system is depicted with three processing units (140, 141, 142) consisting of processors (140a, 141a, 142a) each having an L1 cache (140b, 141b, 142b), and L2 cache (140c, 141c, 142c), and finally, an L3 cache (140d, 141d, 142d). In this hierarchy, each lower-level cache (i.e., an L3 cache is "lower" than an L2) is typically larger in size and has a longer access time than the next higher-level cache. Furthermore, it is common, although not absolutely required, that the lower-level caches contain copies of all blocks present in the higher-level caches. For example, if a block is present in the L2 cache of a given processing unit, that implies the L3 cache for that processing unit also has a (potentially stale) copy of the block. Furthermore, if a block is present in the L1 cache of a given processing unit, it is also present in the L2 and L3 caches of that processing unit. This property is known as inclusion and is well-known to those skilled in the art. Henceforth, it is assumed that the principle of inclusion applies to the cache related to the present invention.

To implement cache coherency in a system such as is shown in FIG. 3, the processors communicate over a common generalized interconnect (143). The processors pass messages over the interconnect indicating their desire to read or write memory locations. When an operation is placed on the interconnect, all of the other processors "snoop" this operation and decide if the state of their caches can allow the requested operation to proceed and, if so, under what conditions. This communication is necessary because, in systems with caches, the most recent valid copy of a given block of memory may have moved from the system memory 144 to one or more of the caches in the system. If a processor (say 140a) attempts to access a memory location not present within its cache hierarchy (140b, 140c and 140d), the correct version of the block, which contains the actual value for the memory location, may either be in the system memory 144 or in one of the caches in processing units 141 and 142. If the correct version is in one of the other caches in the system, it is necessary to obtain the correct value from the cache in the system instead of system memory.

For example, consider a processor, say 140a, attempting to read a location in memory. It first polls its own L1 cache (140b). If the block is not present in the L1 cache (140b), the request is forwarded to the L2 cache (140c). If the block is not present in the L2 cache, the request is forwarded on to the L3 cache (140d). If the block is not present in the L3 cache (140d), the request is then presented on the generalized interconnect (143) to be serviced. Once an operation has been placed on the generalized interconnect, all other processing units "snoop" the operation and determine if the block is present in their caches. If a given processing unit, say 142, has the block of data requested by processing unit 140 in its L1 cache (142a), and the data is modified, by the principle of inclusion, the L2 cache (142c) and the L3 cache (142d) also have copies of the block. Therefore, when the L3 cache (142d) of processing unit 142 snoops the read operation, it will determine that the block requested is present and modified in the L3 cache (142d). When this occurs, the L3 cache (142d) may place a message on the generalized interconnect informing processing unit 140 that it must "retry" its operation again at a later time because the most recently updated value of the memory location for the read operation is in the L3 cache (142d), which is outside of main memory 144, and actions must be taken to make it available to service the read request of processing unit 140.

The L3 cache (142d) may begin a process to push the modified data from the L3 cache to main memory 144. The most recently updated value for the memory location has then been made available to the other processors.

Alternatively, in a process called "intervention," the L3 cache (142d) may send the most recently updated value for the memory location directly to processing unit 140, which requested it. The L3 cache may then begin a process to push the modified data from the L3 cache to main memory. Processing unit 140, specifically its L3 cache (140d), eventually represents the read request on the generalized interconnect. At this point, however, the modified data has been retrieved from the L1 cache of processing unit 142 and the read request from processor 140 will be satisfied. The scenario just described is commonly referred to as a "snoop push." A read request is snooped on the generalized interconnect which causes processing unit 142 to "push" the block to the bottom of the hierarchy to satisfy the read request made by processing unit 140.

The key point to note is that, when a processor wishes to read or write a block, it must communicate that desire with the other processing units in the system in order to maintain cache coherence. To achieve this, the cache-coherence protocol associates, with each block in each level of the cache hierarchy, a status indicator indicating the current "state" of the block. The state information is used to allow certain optimizations in the coherency protocol that reduce message traffic on generalized interconnect 143 and inter-cache connections 140x, 140y, 141x, 141y, 142x, 142y. As one example of this mechanism, when a processing unit executes a read, it receives a message indicating whether or not the read must be retried later. If the read operation is not retried, the message usually also includes information allowing the processing unit to determine if any other processing unit also has a still active copy of the block (this is accomplished by having the other lowest-level caches give a "shared" or "not shared" indication for any read they do not retry).

In this manner, a processing unit can determine whether any other processor in the system has a copy of the block. If no other processing unit has an active copy of the block, the reading processing unit marks the state of the block as "exclusive." If a block is marked exclusive, it is permissible to allow the processing unit to later write the block without first communicating with other processing units in the system because no other processing unit has a copy of the block. Therefore, in general, it is possible for a processor to read or write a location without first communicating this intention onto the interconnection. However, this only occurs in cases where the coherency protocol has ensured that no other processor has an interest in the block. Several details of the exact workings of a multi-level cache coherence protocol have been omitted in this discussion to simplify it. However, the essential aspects that bear on the invention have been described. Those aspects that bear on the invention have been described. Those aspects not described are well-known to those skilled in the art.

Another aspect of multi-level cache structures relevant to the invention are the operations known as deallocations. The blocks in any cache are divided into groups of blocks called "sets". A set is the collection of blocks in which a given memory block can reside. For any given memory block, there is a unique set in the cache that the block can be mapped into, according to preset mapping functions. The number of blocks in a set is referred to as the associativity of the cache (e.g., 2-way set associative means that, for any given memory block, there are two blocks in the cache that the memory block can be mapped into). However, several different blocks in main memory can be mapped to any given set.

When all of the blocks in a set for a given cache are full and that cache receives a request, whether a read or write, to a memory location that maps into the full set, the cache must "deallocate" one of the blocks currently in the set. The cache chooses a block to be evicted by one of a number of means known to those skilled in the art (least recently used (LRU), random, pseudo-LRU, etc.). If the data in the chosen block is modified, that data is written to the next lowest level in the memory hierarchy, which may be another cache (in the case of the L1 or L2 cache) or main memory (in the case of an L3 cache). Note that, by the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block and no longer actively participates in the coherency protocol for the evicted block because, when the cache snoops an operation (either on generalized interconnect 143 or inter-cache connections 140$x$, 141$x$, 142$x$, 140$y$, 141$y$, 142$y$), the block will not be found in the cache.

The present invention discloses a distributed hardware structure to overcome the limitations of a single common bus in a multiprocessor system while utilizing the properties of the single bus so that it does not require a modification to the bus protocol. The resulting system has a scalable system size without compromising the mechanism of a known system bus. The present invention is able to connect together a large number of devices in an SMP system and overcome the limitations of a single-bus-based design.

Although the following description describes the invention with respect to the 6XX bus architecture, the present invention is not intended to be limited to a particular bus architecture as the system presented below can be applied to other bus architectures.

System Address Path Topology

Figure 4:
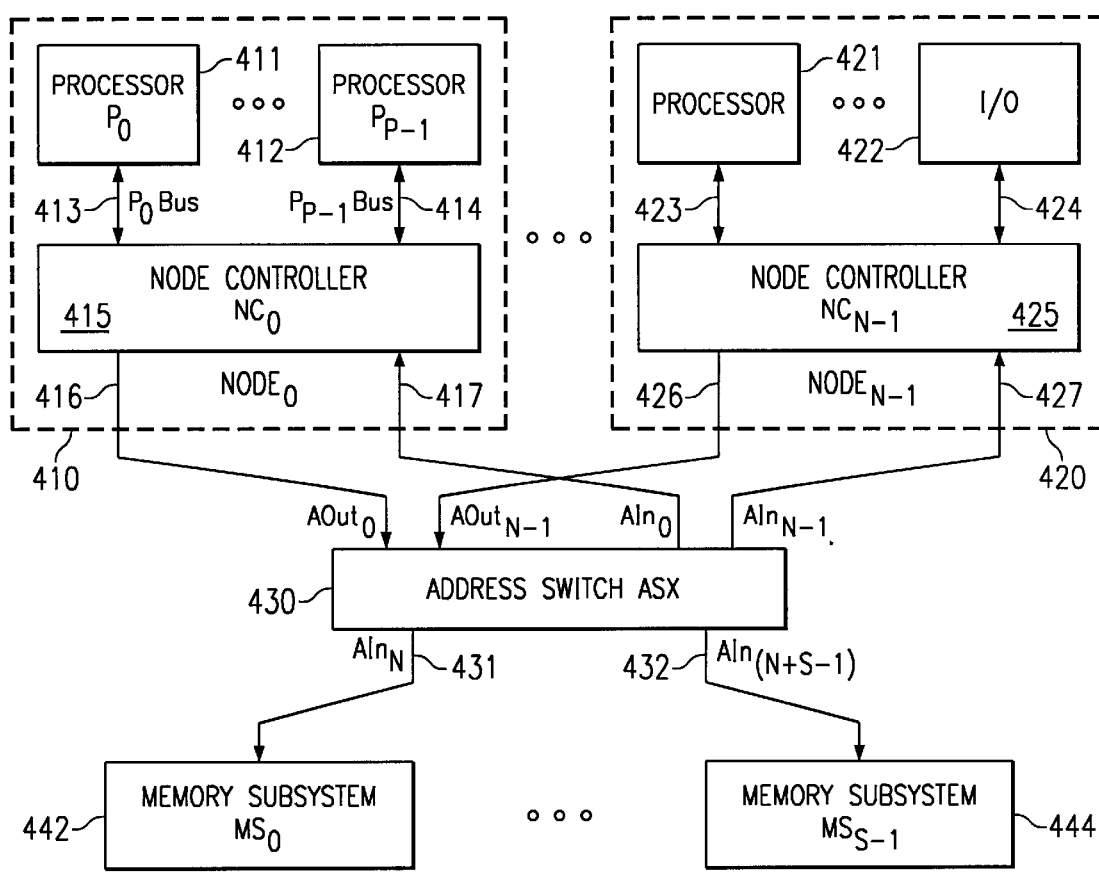
FIG. 4 is a block diagram depicting a distributed system structure for a symmetric multiprocessor system with supporting bus-based cache-coherence protocol from the perspective of address paths within the SMP system.

With reference now to FIG. 4, a block diagram depicts a distributed system structure for a symmetric multiprocessor system with supporting bus-based cache-coherence protocol from the perspective of address paths within the SMP system. FIG. 4 displays a number of master devices that can initiate a command, such as a memory transaction. These master devices, such as processors, I/O agents, and coherent memory adapters, are distributed in clusters among a number of N groups called nodes. Each node is headed by a node controller into which its masters connect.

FIG. 4 shows nodes 410 and 420, which contain groupings of system elements. The number of nodes may vary based on the configuration of the system. Node 410, also labeled as Node$_o$, contains processors 411 and 412, also labeled as Processor P$_0$ and Processor P$_{p-1}$, which are the masters for Node 410. Each node controller has multiple standard bidirectional processor address-data buses over which masters are connected into the distributed system. Processors 411 and 412 connect to node controller 415, also labeled as Node Controller NC$_0$, via buses 413 and 414, also labeled as P$_0$Bus and P$_{p-1}$Bus, respectively. Node 420, also labeled as Node$_{N-1}$, contains processor 421 and I/O agent 422, which are the masters for Node 420. Processor 421 and I/O device 422 connect to node controller 425, also labeled as Node Controller NC$_{N-1}$ via buses 423 and 424, respectively. The number of masters per node may vary depending upon the configuration of the system, and the number of masters at each node is not required to be uniform across all of the nodes in the system.

The node controller constitutes the physical interface between a master and the rest of the system, and each node controller in the system contains all of the necessary logic to arbitrate for individual processor buses and to communicate with its local masters as another master or as a slave, i.e. a device that accepts master commands and executes them but does not generate master commands. A processor sends a command into the system via its local node controller. Although FIG. 4 shows one master per port, multiple masters per port are possible given an appropriate arbitration scheme on the bus of that port. For example, processor 411 could be one of many processors connected to bus 413. However, if more processors are connected to a single port, then their address bus will perform more slowly in terms of bus cycle time.

Alternatively, one of the masters of Node 420 may include a coherent memory adapter that provides communication with another data processing system that maintains cache coherence. The coherent memory adapter may be proximate or remote and may occupy a port of a node controller to send and receive memory transactions in order to behave as a master/slave device in a manner similar to an I/O agent. As one example, another node controller from another data processing system may also be connected to the coherent memory adapter so that data processing systems that employ the present invention may be chained together.

Node controllers 415 and 425 are connected to a device called an address switch (ASX) via pairs of unidirectional address-only buses. Buses 416 and 417, also labeled AOut$_0$ and AIn$_0$, respectively, connect node controller 415 to address switch 430 by a pair of address switch ports. Buses 426 and 427, also labeled AOut$_{N-1}$ and AIn$_{N-1}$, respectively, connect node controller 425 to address switch 430 by a pair of address switch ports. As shown, buses AOut$_x$ carry addresses from the node controllers to the address switch, and buses AIn$_x$ carry addresses from the address switch to the node controllers.

Address switch 430 has additional unidirectional address bus connections 431 and 432, also labeled as AIn$_N$ and AIn$_{(N+S-1)}$, to memory controllers or memory subsystems 442 and 444, also labeled as memory subsystem MS$_0$ and MS$_{S-1}$. The memory controllers are assumed to be slave devices and have no ability to issue commands into the distributed system. The number of memory subsystems may vary depending upon the configuration of the system.

System Data Path Topology

Figure 5:
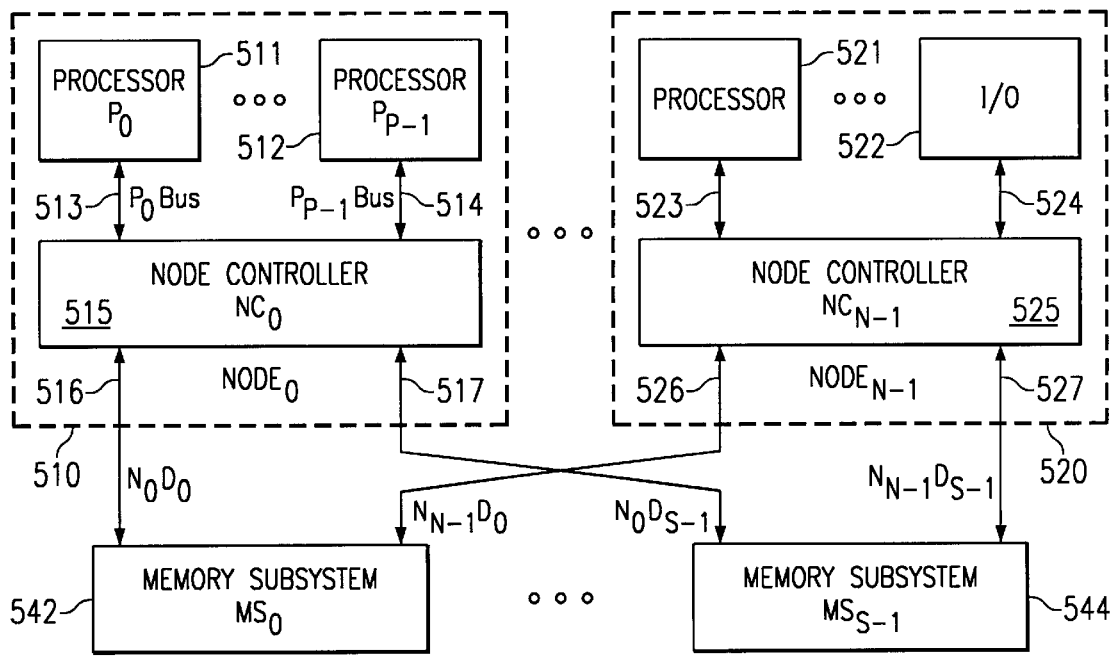
FIG. 5 is a block diagram depicting a distributed system structure for a symmetric multiprocessor system with supporting bus-based cache-coherence protocol from the perspective of data paths within the SMP system.

With reference now to FIG. 5, a block diagram depicts a distributed system structure for a symmetric multiprocessor system with supporting bus-based cache-coherence protocol from the perspective of data paths within the SMP system. In a manner similar to FIG. 4, FIG. 5 displays a number of master devices. These master devices are distributed in clusters among a number of N groups called nodes. Each node is headed by a node controller into which its masters connect. FIG. 5 shows nodes 510 and 520 containing processors 511 and 512. Processors 511 and 512 connect to node controller 515 via buses 513 and 514. Node 520, also labeled as Node$_{N-1}$, contains processor 521 and I/O device 522 that connect to node controller 525, also labeled as Node Controller NC$_{N-1}$ via buses 523 and 524, respectively.

The node controllers shown in FIG. 4 and FIG. 5 could be physically the same system component but are described from different perspectives to show different functionality performed by the node controllers. Whereas FIG. 4 shows address paths within the SMP system, FIG. 5 shows the data paths within the SMP system. Alternatively, in a preferred embodiment, the address paths and data paths may be implemented with supporting functionality in physically separate components, chips, or circuitry, such as a node data controller or a node address controller. The choice of implementing a node controller with separate or combined data and address functionality may depend upon parameters of other system components. For example, if the sizes of the buses supported within the system are small enough, both address and data functionality may be placed within a single node controller component. However, if the buses support 128 bits of data, then pin limitations may physically require the address and data functionality to be placed within separate node controller components.

Alternatively, a separate node data controller may be further separated into multiple node data controllers per node so that each node data controller provides support for a portion of the node's data path. In this manner, the node's data path is sliced across more than one node data controller.

In FIG. 5, each node controller is shown connected to a plurality of memory controllers, such as memory subsystems $MS_0$ and $MS_{S-1}$. Although each node controller is shown to connect to each memory controller via an independent data bus, multiple nodes and/or multiple memory controllers may be connected on the same data bus if an appropriate arbitration mechanism is included. As with connecting a plurality of master devices to a single node controller via a single bus, the switching rate will be a function of the number of devices connected to the bus. Node controller 515 includes a plurality of memory subsystem ports to connect the node controller to memory subsystem 542 via data bus 516, and to memory subsystem 544 via bus 517, also labeled as $N_0D_0$ and $N_0D_{S-1}$, respectively. Node controller 525 includes a plurality of memory subsystem ports to connect the node controller to memory subsystem 544 via data bus 527, and to memory subsystem 542 via data bus 526, also labeled as $N_{N-1}D_0$ and $N_{N-1}D_{S-1}$, respectively.

Instead of a single data bus that transfers data belonging to all of the masters, there are multiple data buses, each of which carries only a small portion of the data traffic that would be carried if the masters were connected to a single bus. In so doing, the component interfaces may be clocked faster than would be possible with a single bus. This configuration permits the allocation of more data bus bandwidth per master than would be possible on a single bus, leading to lower queueing delays.

Node Controller Internal Address Paths

Figure 6:
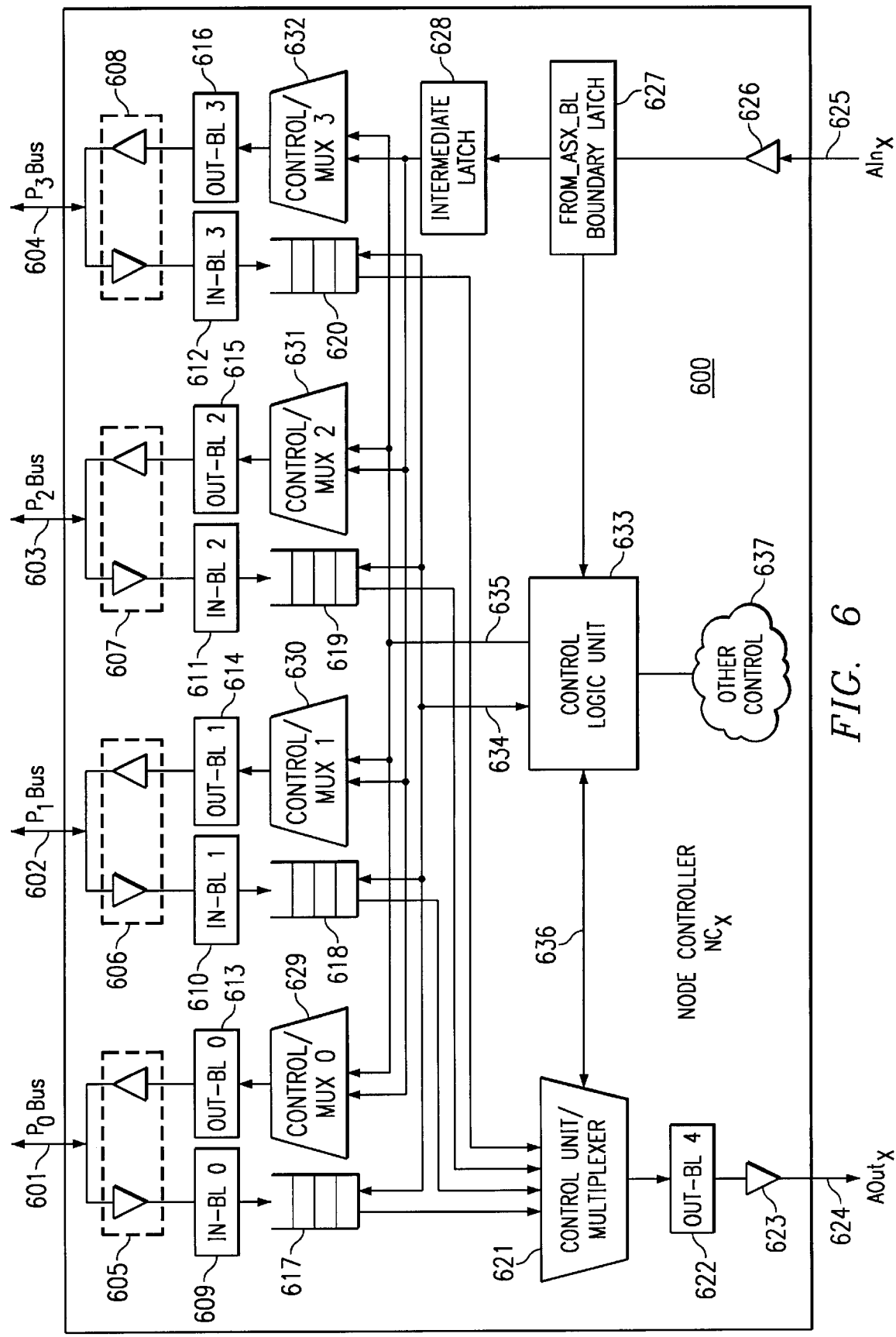
FIG. 6 is a block diagram depicting the address paths internal to a node controller.

With reference now to FIG. 6, a block diagram depicts the address paths internal to a node controller. Node controller 600, also labeled $NC_x$, is similar to node controllers 415 and 425 in FIG. 4 or node controllers 515 and 525 in FIG. 5. Individual ports of node controller 600 have their own queues to buffer commands from masters as the commands enter the node controller. A command may incur non-deterministic delay while waiting in these buffers for progressive selection toward the address switch.

Node controller 600 has bidirectional buses 601–604 that connect to master devices. Buses 601–604 connect to input boundary latches 609–612 and output boundary latches 613–616 via bus transceivers 605–608. Input boundary latches 609–612 feed buffers 617–620 that hold the commands from the master devices. A command from a master device may consist of a transaction tag, transaction type, target or source address, and other possible related information. Buffers 617–620 may hold all information related to a command, if necessary, or may alternatively hold only the information necessary for the functioning of the address path within the node controller. The information held by the input buffers may vary depending on alternative configurations of a node controller. Buffers 617–620 feed control unit/multiplexer 621 that selects one command at a time to send to the address switch via latch 622, transmitter 623, and bus 624, also labeled $AOut_x$.

Node controller 600 receives commands from masters via buses 601–604 for eventual transmittal through boundary latch 622 and transmitter 623 to the address switch via bus 624, also labeled bus $AOut_x$. In a corresponding manner, node controller 600 accepts commands from the address switch via bus 625, also labeled bus $AIn_x$, and receiver 626 for capture in boundary latch 627, also labeled as FROM_ASX_BL. These commands follow an address path through a fixed number of latches that have a fixed delay, such as intermediate latch 628 and output boundary latches 613–616, before reaching buses 601–604. In addition, commands to master devices also pass through a multiplexer per port, such as control units/multiplexors 629–632, that also have a fixed delay. In this manner, commands arriving via bus 625 traverse a path with a fixed delay of a deterministic number of cycles along the path. In other words, a fixed period of time occurs between the point when a command reaches latch FROM_ASX_BL to the point at which each master device, such as a set of processors connected to the node controller, is presented with the arriving command.

The arbiters for the ports connected to the masters are designed to give highest priority to the node controllers driving the port buses. If a master makes a request to drive a bus at the same time that the node controller expects to drive it, the node controller is given highest priority. In a preferred embodiment, to assist with this arbitration scenario, a signal called "SnoopValid" (not shown) is asserted by the address switch ahead of the command being sent by the address switch. This allows the arbitration for the bus accesses between a node controller and its masters to be completed early enough to ensure that a command arriving from the address switch via the $AIn_x$ bus does not stall for even one cycle while inside the node controller. This guarantees that the time period for the fixed number of latches along the $AIn_x$-to-$P_x$Bus paths actually resolve to a deterministic number of cycles.

Control logic unit 633 is also presented with the incoming command latched into the FROM_ASX_BL latch for appropriate determination of control signals to other units or components within node controller 600. For example, control logic unit 633 communicates with buffers 617–620 via control signals 634, control unit/multiplexer 621 via control signals 636, and control units/multiplexors 629–632 via control signals 635 to select commands, resolve collisions, and modify fields of commands, including a command's type if necessary, in order to ensure the continuous flow of commands within node controller 600. Control logic unit 633 also receives other control signals 637, as appropriate.

Address Switch Internal Address Paths

Figure 7:
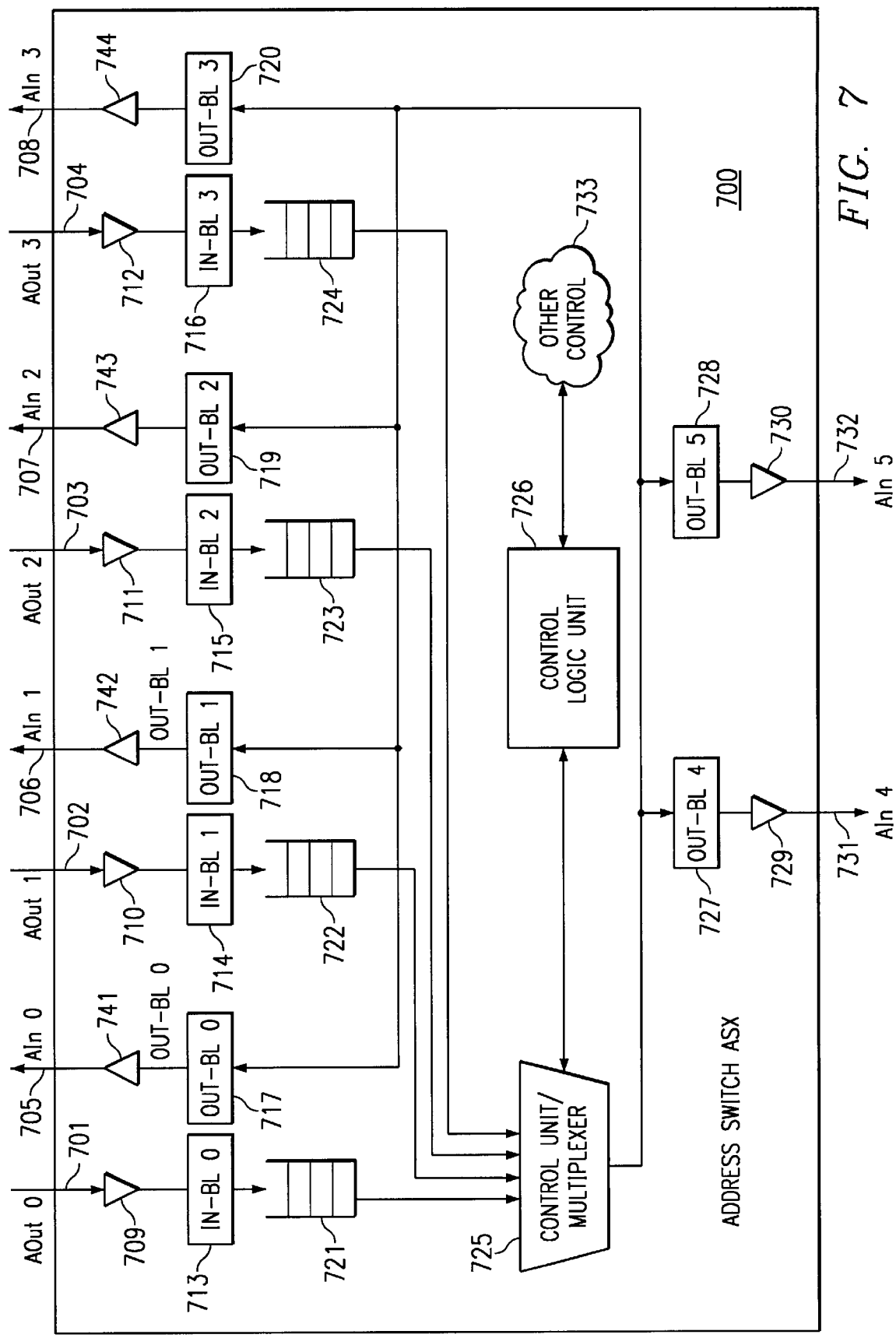
FIG. 7 is a diagram depicting the internal address paths of an address switch connecting node controllers and memory subsystems.

With reference now to FIG. 7, a diagram depicts the internal address paths of an address switch connecting node controllers and memory subsystems. Address switch 700 connects a set of four node controllers and two memory subsystems. Commands arrive at first-in first-out (FIFO) queues 721–724 from buses 701–704, also labeled $AOut_0$-$AOut_3$, via receivers 709–712 and input boundary latches 713–716. These commands may reside within a FIFO before being selected by control unit/multiplexer 725. A command may experience a finite but non-deterministic number of cycles of delays while sitting in the FIFO. Control logic unit 726 may communicate with control unit/multiplexer 725 and FIFOs 721–724 in order to determine the selection of incoming commands. Control logic unit 726 also receives other control signals 733, as appropriate.

Control unit/multiplexer 725 selects one command at a time to be broadcast to the node controllers and memory subsystems over paths that are deterministic in terms of the number of cycles of delay. In the example shown in FIG. 7, commands are sent to the memory subsystems via unidirectional buses 731 and 732, also labeled as buses $AIn_4$ and $AIn_5$, through output boundary latches 727 and 728 and transmitters 729 and 730. Commands are sent to node controllers via unidirectional buses 705–708, also labeled as buses $AIn_0$-$AIn_3$, through output boundary latches 717–720 and transmitters 741–744. In this example, there is only a single cycle of delay at the output boundary latches 717–720, 727, and 728.

From the descriptions above for FIGS. 4–7, it may be understood that a transaction is issued by a master device via its bus and port to its node controller. The node controller will provide some type of immediate response to the master device via the bus and may queue the transaction for subsequent issuance to the rest of the system. Once the transaction is issued to the rest of the system, the address switch ensures that the transaction can be broadcast to the rest of the system with a known propagation delay so that the other devices may snoop the transaction.

According to the distributed system structure of the present invention, each of the devices within the system would be able to see the transaction in the same cycle and provide a coherence response within the same cycle. The address switch is able to broadcast a transaction to all node controllers, including the node controller of the node containing the device that issued the transaction. Appropriate logic is embedded within each node controller so that a node controller may determine whether the incoming transaction being snooped was originally issued by a device on one of its ports. If so, then the node controller ensures that the bus on the port that issued the transaction is not snooped with a transaction that was received from that port. Otherwise, the device may get "confused" by being snooped with its own transaction. If the device were to receive a snoop of its own transaction, then the device may issue a response indicating a collision with its original transaction. If that were the case, since the original transaction is actually the transaction that is being snooped, then the "collision" would never be resolved, and the transaction would never complete.

More details of the manner in which the transactions are issued and completed are provided below.

Memory Subsystem Internal Address Paths

Figure 8:
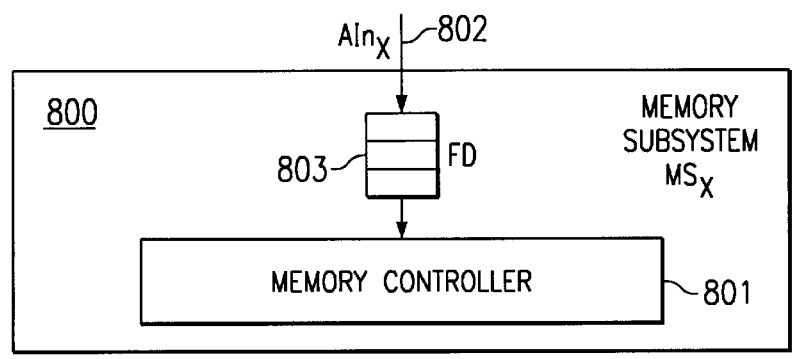
FIG. 8 is a diagram depicting a memory subsystem connected to the address switch of the distributed system of the present invention.

With reference now to FIG. 8, a diagram depicts a memory subsystem connected to the address switch of the distributed system of the present invention. FIG. 8 shows memory subsystem 800, also labeled memory subsystem $MS_x$. Memory controller 801 within memory subsystem 800 receives a command from the address switch via unidirectional bus 802, also labeled as bus $AIn_x$, through a number of latches FD 803, which is merely a fixed delay pipe. In this manner, a command sent by the address switch experiences a fixed number of cycles of delay before the command is made available to the memory controller.

As shown previously, a command arriving at a node controller via bus $AIn_x$ traverses a deterministic delay path from its capture in the FROM_ASX_BL latch to its presentation to a master device. In a similar manner, a command traverses a deterministic delay path from the control unit/multiplexer within the address switch to the fixed delay pipe within the memory subsystem. If the delay of the latches FD 803 within the memory subsystem is adjusted to the appropriate value, it can be ensured that the memory controller is presented with a command at the same time that the masters connected to the ports of the node controllers are presented with the same command. Hence, there is a deterministic number of cycles between the point at which the control unit/multiplexer within the address switch broadcasts a transaction and the point at which the masters and memory controllers receive the command.

Since only a small number of masters are connected to each port of a node controller, the speed at which each bus is connected to these ports may be operated is independent of the total number of ports in the system. For example, if a single master is connected to each port, its bus can be run in point-to-point mode at the best possible speed. Hence, the distributed structure of the present invention is able to scale well-understood and easier-to-verify bus-based cache-coherent protocols for multiprocessors to enhance the bandwidth of the system.

Node Controller Internal Data Paths

With reference now to FIG. 9, a block diagram depicts the data paths internal to a node controller. Node controller 900, also labeled $NC_x$, is similar to node controllers 415 and 425 in FIG. 4 or node controllers 515 and 525 in FIG. 5. Individual ports of node controller 900 have their own queues to buffer data from masters as data enters the node controller. Data may incur non-deterministic delay while waiting in these buffers for progressive movement toward destinations.

Node controller 900 has bidirectional buses 901–904, also labeled $P_xBus$, that connect to master devices. Buses 901–904 connect to input boundary latches 909–912 and output boundary latches 913–916 via bus transceivers 905–908. Input boundary latches 909–912 feed data buffers 917–920 that hold the data from the master devices.

Incoming data from one of the node controller's ports may be directed to a memory subsystem or another cache. In the example shown in FIG. 9, which continues the example shown in FIG. 6, incoming data from one of the node controller's ports may be directed to one of three locations: memory subsystem $MS_0$, memory subsystem $MS_{S-1}$, or a cache-to-cache FIFO (FIFO C2C) for forwarding data within the node. With the FIFO C2C mechanism, each node is able to transfer data from one of its ports to another port, thereby allowing the transfer of data from one master to another. Buffers 917–920 feed multiplexors 925–927 that select a data source for forwarding data. Control logic unit 939 provides control signals for multiplexer 925 to select data to be sent to memory subsystem $MS_0$ and for multiplexer 926 to select data to be sent to memory subsystem $MS_{S-}$. Node controller 900 sends data from multiplexors 925 and 926 through boundary latches 931 and 933 and transceivers 935 and 936 to memory subsystem $MS_0$ and memory subsystem $MS_{S-1}$, via bidirectional buses 937 and 938, also labeled $N_xD_0$ and $N_xD_{S-1}$. Control logic unit 939 provides control signals for multiplexer 927 to select data to be forwarded within the node. Data is then queued into FIFO 928.

In a corresponding manner, node controller 900 accepts data through transceivers 935 and 936 and boundary latches 932 and 934 from memory subsystem MS$_0$ and memory subsystem MS$_{S-1}$ via bidirectional buses 937 and 938. Data is then queued into appropriate FIFOs 929 and 930. Data from FIFOs 928–930 pass through a multiplexer per port, such as control units/multiplexors 921–924. Control logic unit 939 provides control signals for multiplexors 921–924 to select data to be sent to the master devices. Control logic unit 939 also receives other control signals 940, as appropriate. Hence, the node controller has arbitration logic for data buses and is self-sufficient in terms of controlling the data transfers with parallelism. In this manner, the distributed system structure of the present invention is able to improve system data throughput.

Response Combination Block (RCB)

Figure 10A:
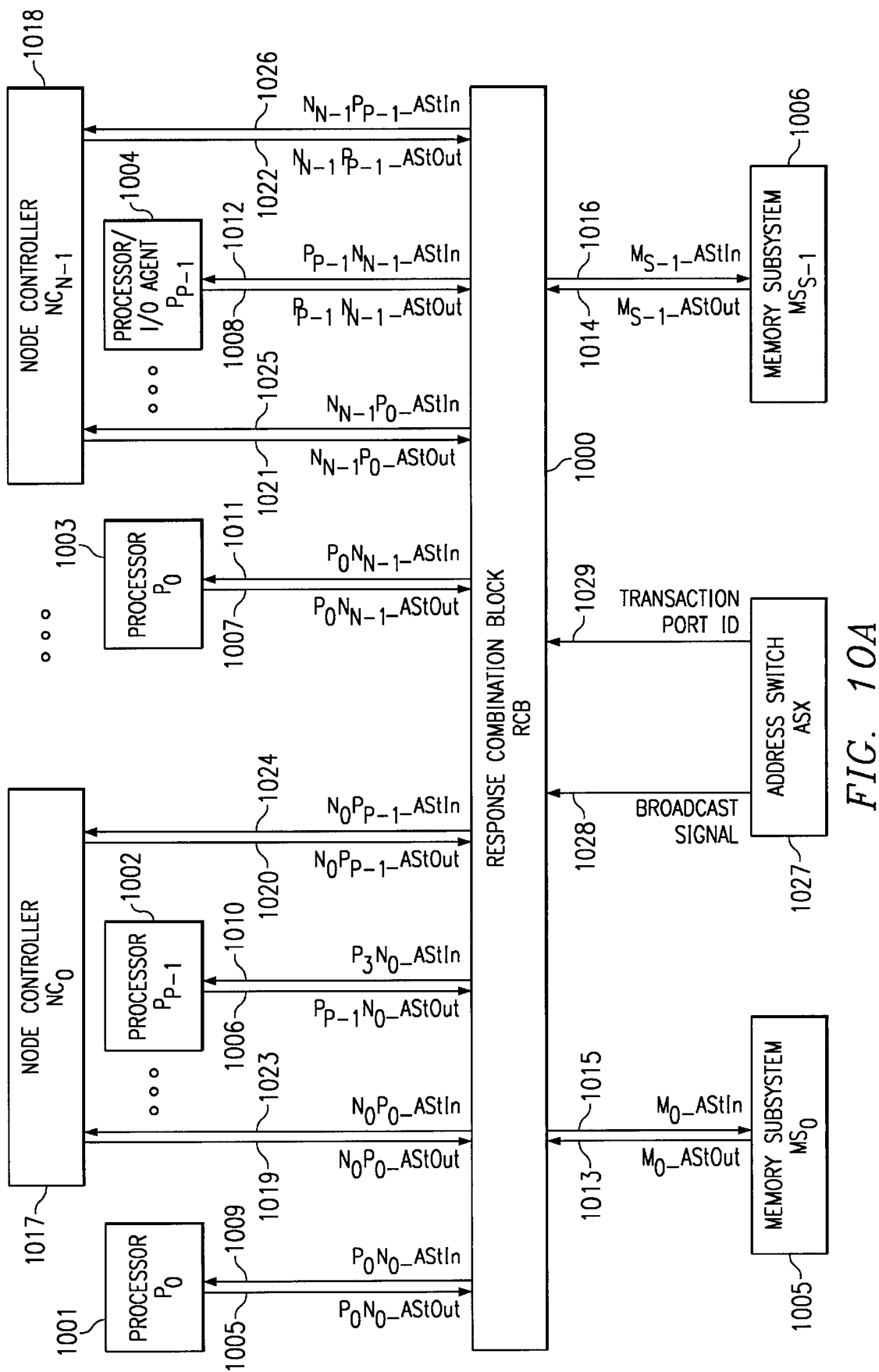
FIGS. 10A–10B are block diagrams depicting the system structure for determining bus response signals for a distributed system structure.
Figure 10B:
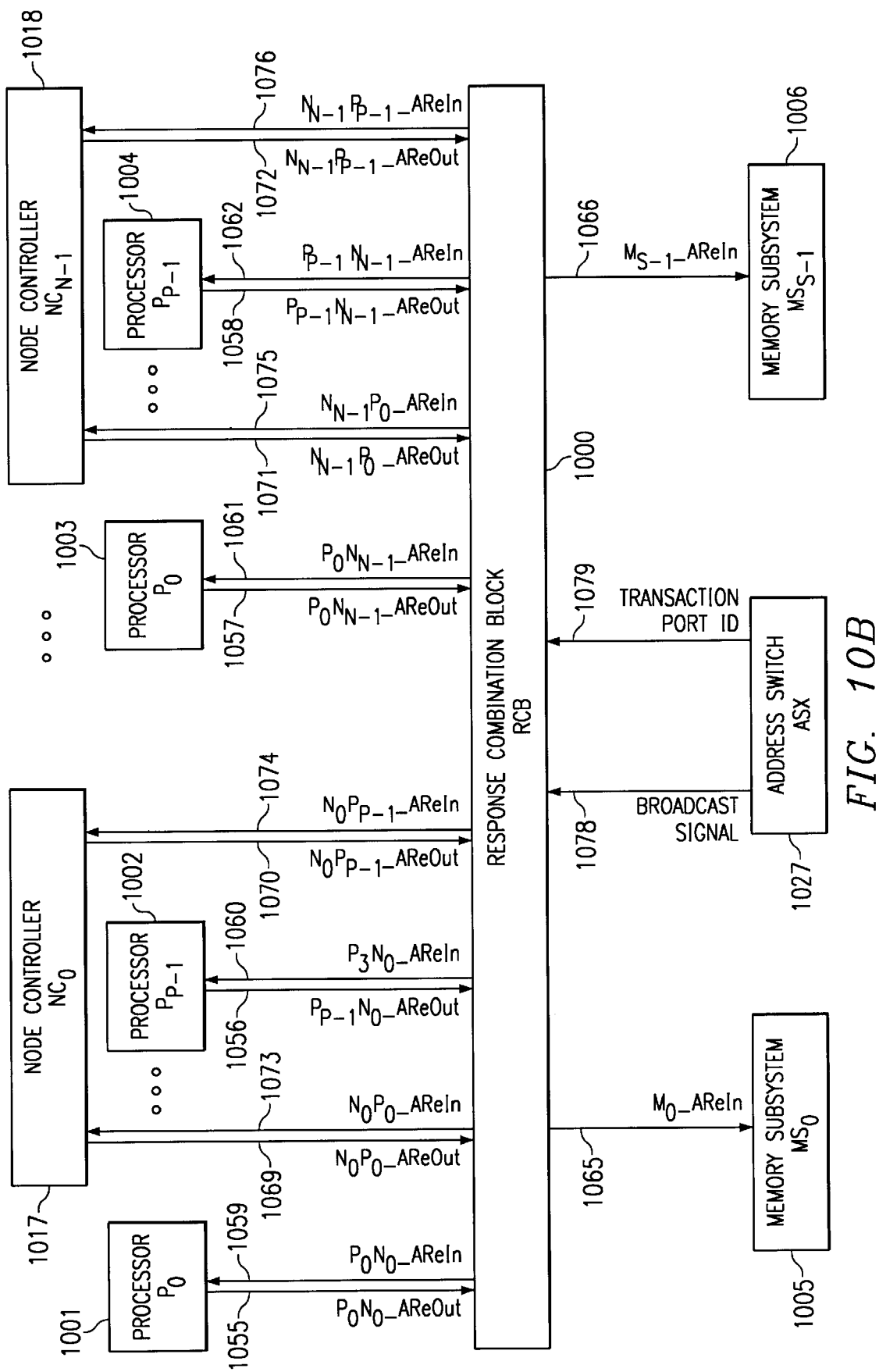

With reference now to FIGS. 10A–10B, a block diagram depicts the system structure for determining bus response signals for a distributed system structure similar to that shown in FIG. 4 and FIG. 5. FIG. 10A and FIG. 10B show the connectivities of devices in the distributed system structure of the present invention with a control logic block for combining bus signals (responses) AStat and AResp, respectively. For the sake of clarity, the AStat signals and the AResp signals have been shown separately. It should again be noted that I/O agents may act as master devices connected to the ports of the node controllers shown in FIG. 10A and FIG. 10B.

As shown in FIG. 10A, processors 1001–1004, also labeled P$_x$, have unidirectional AStatOut signals 1005–1008, also labeled P$_x$N$_x$AStOut, and AStatIn signals 1009–1012, also labeled P$_x$N$_x$AStIn, connecting the processors to Response Combination Block (RCB) 1000. The slave devices, such as memory subsystems 1005 and 1006, also labeled MS$_x$, connect to the RCB with AStatOut signals 1013 and 1014, also labeled M$_x$_AStOut, and with AStatIn signals 1015 and 1016, also labeled M$_x$_AStIn. Node controllers 1017 and 1018, also labeled NC$_x$, also connect to the RCB via a similar set of per port unidirectional AStatOut signals 1019–1022, also labeled N$_x$P$_x$AStOut, and AStatIn signals 1023–1026, also labeled N$_x$P$_x$AStIn. Address switch 1027, also labeled ASX, participates in determining the proper logic for system processing of a transaction by supplying broadcast signal 1028 and transaction source ID 1029, which is an encoding of a node identifier together with a port identifier within the node through which a master device issued a transaction to the system.

As shown in FIG. 10B, processors 1001–1004 have unidirectional ARespOut signals 1055–1058, also labeled P$_x$N$_x$AReOut, and ARespIn signals 1059–1062, also labeled P$_x$N$_x$AReIn, connecting the processors to RCB 1000. Memory subsystems 1005 and 1006 connect to the RCB with ARespIn signals 1065 and 1066, also labeled M$_x$_AReIn. Memory subsystems 1005 and 1006 do not connect with ARespOut lines, which are not driven by these slave devices. Node controllers 1017 and 1018 also connect to the RCB via a similar set of per port unidirectional ARespOut signals 1069—1072, also labeled N$_x$P$_x$AReOut, and ARespIn signals 1073–1076, also labeled N$_x$P$_x$AReIn. Again, address switch 1027 participates in determining the proper logic of a transaction by supplying broadcast signal 1028 and transaction port ID 1029.

As is apparent from FIGS. 10A–10B, a set of AStatIn/AStatOut signals and ARespIn/ARespOut signals to/from a master device is paired with a similar set of AStatIn/AStatOut signals and ARespIn/ARespOut signals to/from its node controller. This pairing is done on a per port basis. As discussed above, each port in the example is shown with a single master device connected to each port. However, if more than one master device were connected per port, then the pairs of AStatIn/AStatOut signals and ARespIn/ARespOut signals are used by the set of master devices connected to the bus on that port as in a standard single bus configuration.

In the preferred embodiment, RCB combines the AStatOuts and ARespOuts from various source devices and produces AStatIn and ARespIn signals per the 6XX bus specification, as described in IBM Server Group Power PC MP System Bus Description, Version 5.3, herein incorporated by reference. The RCB receives the AStatOuts and ARespouts signals and returns AStatIns and ARespIns, respectively. Not all of the devices receive the same responses for a particular transaction. The signals received by each device are determined on a per cycle basis as described in more detail further below.

Local/Global Cycles

During any given system cycle, a master device at a port may be issuing a transaction over its port's bus for receipt by its node controller or the node controller may be presenting the master device with a transaction forwarded by the address switch in order to snoop the transaction. When the master device is issuing a transaction, the cycle is labeled "local," and when the node controller is presenting a transaction, the cycle is labeled "global."

As described above, the address switch broadcasts one transaction at a time to all of the node controllers, and there is a fixed delay between the time the address switch issues such a transaction and the time it appears at the ports of each node controller. Under this regime, after a node controller has received a broadcast transaction from the address switch and then, a predetermined number of cycles later, is presenting the transaction to the devices on the buses of the ports of the node controller during a cycle, all node controllers are performing the same action on all of their ports during the same cycle, except for one exception, as explained below. Thus, when there is a global cycle being executed on the bus of one of the ports, global cycles are being executed on all the ports in the system. All remaining cycles are local cycles.

During local cycles, activity at a port is not correlated with activity at other ports within the system. Depending on whether or not a device needed to issue a transaction, the local cycle would be occupied or would be idle. Hence, a global cycle occurs when a transaction is being snooped by all the devices in the system, and only a local cycle may be used by a device to issue a transaction.

Operation of RCB During Local Vs Global Cycles

Given that the entire system's cycles are "colored" as either local or global, the response generation, the response combination, and the response reception cycles, which occur after a fixed number of cycles subsequent to the issuance of a transaction, are similarly labeled local response windows or global response windows. For this reason, the RCB's response combination function is correspondingly considered to be in either local or global mode during a given cycle. During local cycles, the RCB combines responses on a per port basis. That is, the RCB combines the response of a port and the response that the node controller produces corresponding to that port. During global cycles, the RCB combines responses from all the ports and node controllers in the system (again, except for one port, as explained below).

To achieve proper switching between local and global combination modes, the RCB is provided with a signal indicating the broadcast of a transaction by the address switch to the node controllers, shown as broadcast signal 1028 in FIG. 10A, as well as the transaction source ID signal 1029. Configuration information stored in the RCB indicates the exact cycle in which the combination of responses is to be performed for the broadcast transaction after the arrival of the broadcast transaction signal. In this manner, for each global cycle, the RCB is orchestrated to combine responses from appropriate sources.

Primary Vs Secondary Local Cycles

A processor may issue a transaction only during local cycles. For certain types of transactions, the processor issues the transaction only once. For certain other types of transactions, the processor might be required to issue the transaction multiple times. The processor is directed by its node controller, in conjunction with the RCB, through the use of the AStatIn/AStatOut signals and the ARespIn/ARespOut signals as to the actions that should be performed.

The local cycles in which a processor issues transactions for the first time are labeled "primary local cycles" whereas all other local cycles are labeled "secondary local cycles". In the 6XX bus architecture, a secondary transaction is marked by the "R" bit being set to "1". In other words, its response-related cycles get labeled primary or secondary in the proper manner corresponding to the transaction issuance.

Achievement of Coherence by Snooping in a Temporally and Spatially Distributed Manner From the foregoing description, it should be obvious that processors and devices see transactions from other processors and devices during cycles different than the cycle in which are issued to the system. This is unlike the situation with a snooping protocol in a single bus environment in which all the devices in the system observe a transaction at the same time that it is issued and simultaneously produce a coherence response for it and in which the originator of the transaction receives the response at that same time. Thus, in the current system, the achievement of coherence is both distributed in time and distributed in space, i.e. across multiple cycles and multiple buses connected to multiple node controllers.

In using the distributed system structure, it is important to achieve global coherence in an efficient manner. To do so, all transactions are sorted into two categories: (1) transactions for which it is possible to predict the global coherence response and deliver it in the primary response window; and (2) transactions for which it is necessary to snoop globally before the ultimate coherence response can be computed.

In the first case, the node controller accepts the transaction and issues a global coherence response to the issuing entity in the primary response window. The node controller then takes full responsibility of completing the transaction in the system at a later time and achieving the global response.

In the second case, the node controller takes three steps. First, the node controller accepts the transaction and delivers a primary response that indicates postponement of achievement and delivery of the global response. In the 6XX bus architecture, this response is the "Rerun" response. Second, at a subsequent time, the node controller achieves a global coherence response for that transaction. And third, the node controller requests that the processor issue a secondary transaction and delivers the global response in the secondary response window. In the 6XX bus architecture, the request to the processor to issue a secondary transaction is made by issuing it a Rerun command with a tag corresponding to the original transaction. The processor may then use the tag to identify which of its transactions should be rerun.

Rerun Commands and Secondary Responses

As noted above, a transaction accepted from a device is snooped to the rest of the system. During such a snoop, the device that issued the transaction is not snooped so that the device does not get confused by being snooped with its own transaction.

In fact, for transactions in the first case above, i.e. transactions in which the node controller accepts the transaction and issues a global coherence response to the issuing entity in the primary response window, the port corresponding to the device that issued the transaction is kept in the local mode in the transaction's snoop cycle so that the processor may issue another transaction. As stated above, during the response window corresponding to the transaction's snoop cycle, the RCB is configured to combine responses from all sources other than the port on the node controller that issued the transaction. The node controller is then able to supply a primary or secondary response over that port if the processor chooses to issue a transaction.

For transactions in the second case above, i.e. transactions for which it is necessary to snoop globally before the ultimate coherence response can be computed, the node controller keeps the particular port in local mode but issues it a Rerun transaction. The control unit/multiplexer feeding the outgoing boundary latch at the port allows the node controller to achieve this functionality.

Alternatively, the node controller may choose to not be as aggressive, and instead of letting the device issue a transaction, the node controller might itself issue a null or rerun transaction, as required, to the device in the cycle during which the device's transaction is being snooped in the rest of the system.

Figure 10C:
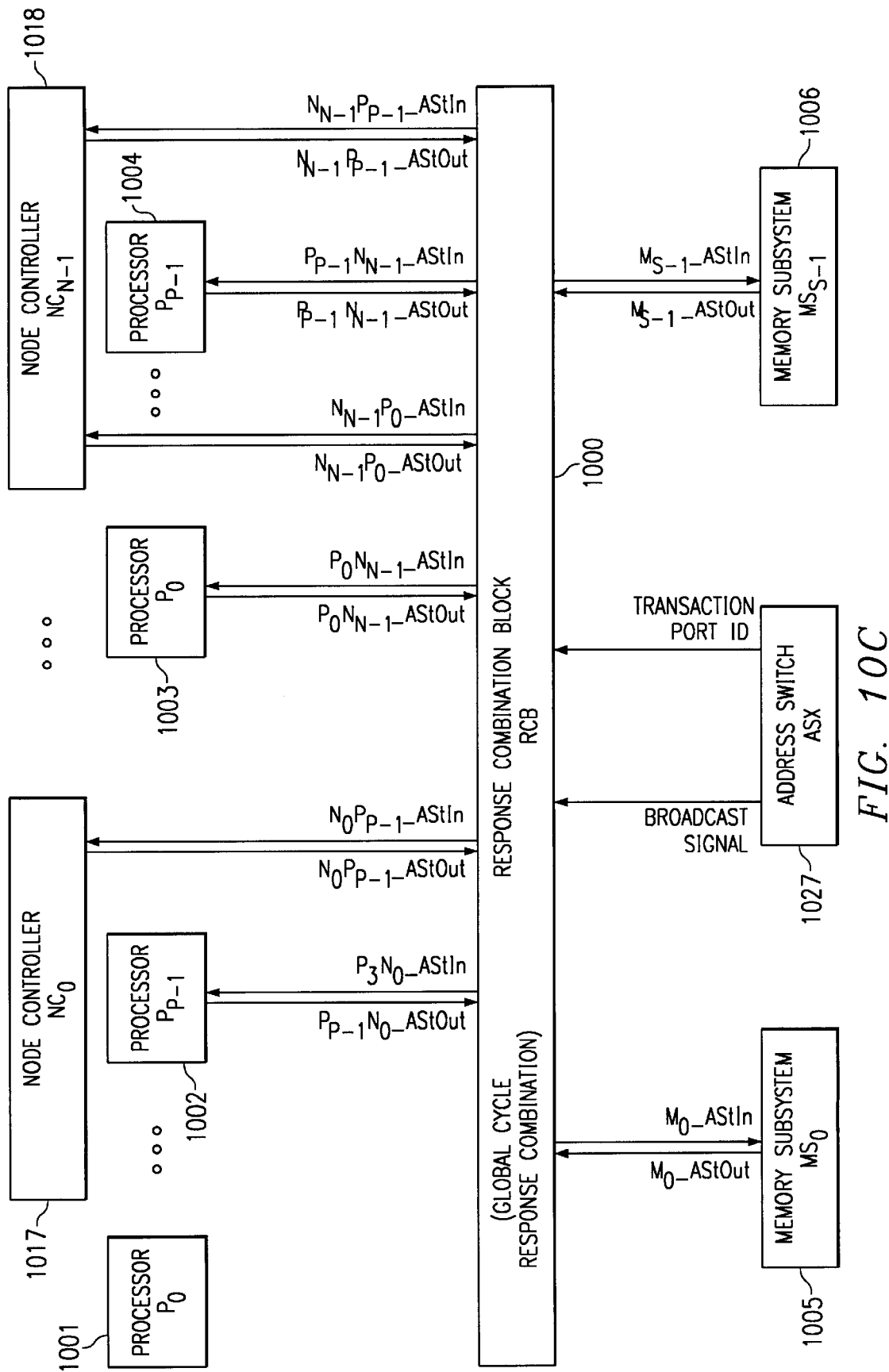
FIGS. 10C–10D are block diagrams depicting the components whose signals participate in the local and global cycles.
Figure 10D:
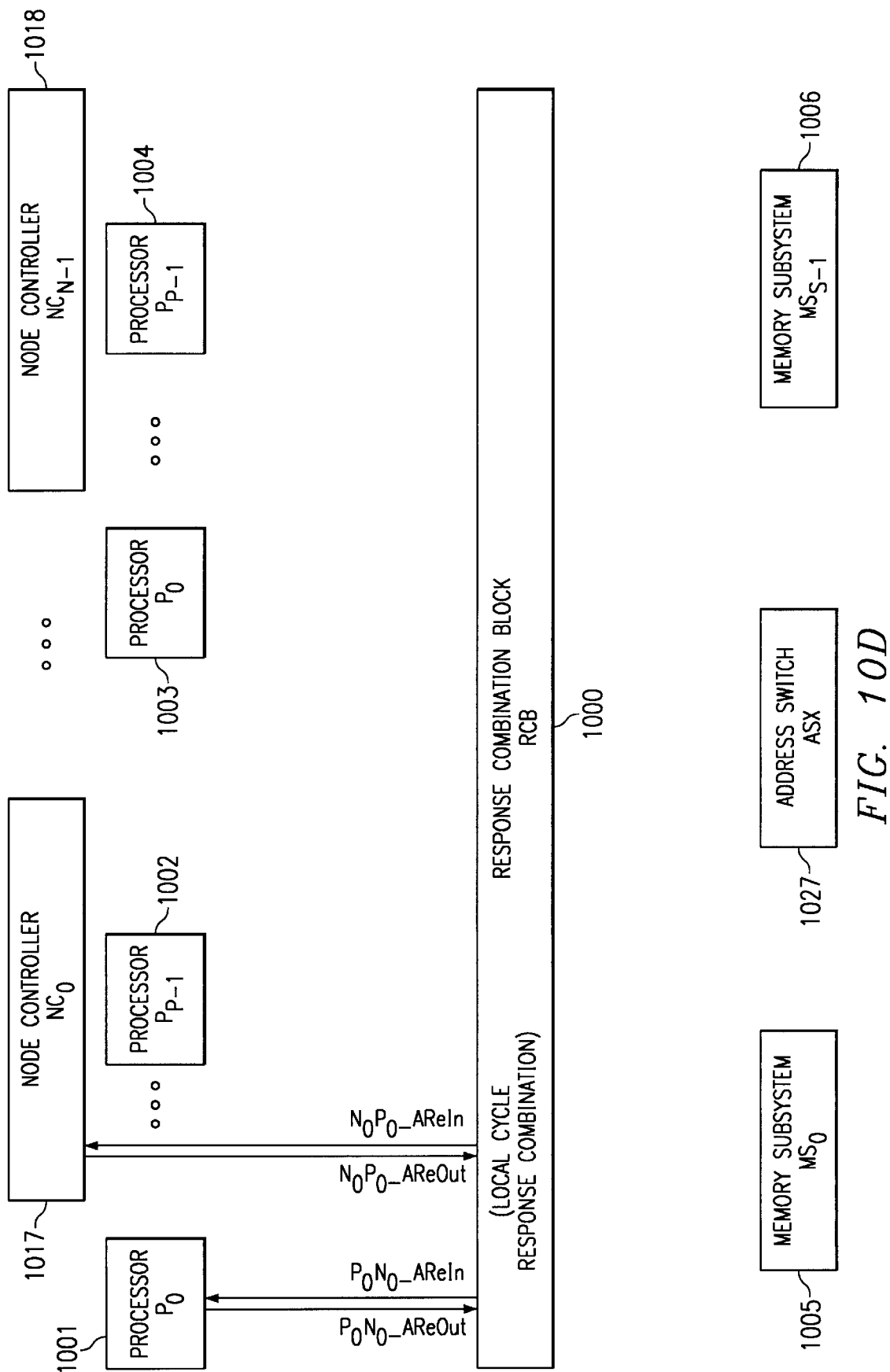

With reference now to FIGS. 10C–10D, a block diagram depicts the components whose signals participate in the local and global cycles. FIG. 10C shows the signals which are considered by the RCB during a global cycle. In the example shown, the signals for a single master device, processor 1001, do not participate in the determination by the RCB of the appropriate signals to the other devices, node controllers, and memory subsystems for the global response. The signals for processor 1001 are paired with the corresponding signals from its node controller, which are also not considered for the global response. From the perspective of processor 1001, it is kept in a local cycle while a transaction issued by processor 1001 is snooped to the rest of the system. As noted earlier, although a processor is depicted, the signals are considered on a per port basis, and the bus of a particular port is kept in a local cycle while the rest of the system is in a global cycle.

FIG. 10D shows the signals which are considered by the RCB during a local cycle. In the example shown, the signals from a single master device, processor 1001, participate in the determination by the RCB of the appropriate signals to be returned to processor 1001 and its node controller. Signals from the other devices, node controllers, and memory subsystems may be simultaneously participating in the response for the global response. The signals for processor 1001 are paired with the corresponding signals from its node controller, which also do not affect the global response. From the perspective of processor 1001, it may issue another transaction while its other transaction is snooped to the rest of the system. For the sake of clarity, signals from the address switch are not shown for the local cycle, although the RCB uses these signals to determine which port to place into the local cycle.

Achieving Correct Order Among Bus Memory Transactions

For a computer system to work correctly, certain memory access transactions and other types of transactions issued by master devices have to be ordered correctly and unambiguously. In a system with a single system bus, this task is trivially achieved since the order in which the transactions are presented on the bus is the order imposed on those transactions. However, in a distributed system with multiple buses, the task demands that an order be imposed on the transactions queued throughout the system. The distributed architecture of the present invention allows a correct and unambiguous order to be imposed on a set of transactions. The invention also offers an efficient means of achieving the order so that a snooping, hardware cache-coherence protocol can be supported.

When devices in an SMP system access memory, either under the influence of programs or control sequences, they issue memory transactions. The devices may also issue other bus transactions to achieve coherence, ordering, interrupts, etc., in the system. These transactions can usually complete in parallel without interference from other transactions. However, when two transactions refer to addresses within the same double word, for example, they are said to have "collided," according to the 6XX bus terminology, and the two transactions must be completed in some specific order. In some cases, either completion order is acceptable, and at other times, the order is fixed and is implied by the types of transactions. For instance, if a read transaction and a Write transaction attempt to access an address declared as Memory Coherence Not Required, any order of completion for the two transactions is acceptable. However, if they refer to a cachable address to be maintained coherent, the order of completion must appear to be the write followed by the read.

Means of Imposing a Default Order on Transactions

In the distributed SMP system described in FIGS. 4–10D, multiple processors and other devices can issue transactions simultaneously over the multiple buses in the system. Thus, at the outset, there is ambiguity regarding the order of the transactions as they are issued. As they flow through the system, as a first step, the system imposes a "heuristic order of arrival" over them that is reasonable and fair. This preliminary order is not necessarily the order in which the transactions eventually complete in the system. If two colliding transactions are simultaneously active in the system, the one that ranked "earlier of the two" by the heuristic order of arrival will be slated to be completed first if coherence does not require otherwise.

As soon as commands enter the system, they are "registered" by the node controllers, i.e. they stored by the node controllers and are available for analysis and collision checks. Node controllers send one of the registered transactions at a time to the address switch. The address switch chooses one transaction at a time with a fair arbitration among the transactions sent to it and then broadcasts the chosen transaction back to the node controllers and to the memory subsystems. The address portion of the transaction broadcast by the address switch is first latched inside the node controller in the boundary latch FROM_ASX_BL. As described above, in any cycle, a unique transaction is latched in FROM_ASX_BL at all node controllers and memory subsystems, and all other registered transactions that have entered until that cycle and are still active, including the transaction currently in FROM_ASX_BL, can "see" this transaction. These two properties are used to define the order of arrival of transactions using the following reasonable and fair heuristic: the order of arrival of a transaction into the system is the same as the order of its arrival at FROM_ASX_BL.

When a transaction arrives in FROM_ASX_BL for the first time, it is marked as being "snooped," to indicate the fact that in a fixed number of cycles following the current cycle, the transaction will be presented for snooping, for the first time, to all the devices in the system. The following rule is used to assign a transaction its relative position in the order of transactions to be completed, irrespective of the actual time it entered the system: a registered transaction that already is marked as snooped is nominally defined to have entered the system earlier than the current transaction in FROM_ASX_BL. The ones that have not been marked as snooped are nominally defined to have entered the system later than the current transaction in FROM_ASX_BL.

Method for Achieving the Correct Completion Sequence for Transactions

The transaction in FROM_ASX_BL stays there for one cycle. During that cycle, the transaction is compared with every other transaction currently registered in the entire system for detection of collision and ordering decision. There could be two sets of results of each of these pairwise comparisons: one that affects the completion of the transaction currently in FROM_ASX_BL and the second that affects the completion of some other transaction.

Each comparison results in a decision to either allow the current presentation of the transaction in FROM_ASX_BL for snooping to complete, or to postpone its completion to a later time. The postponement is effected via the computation of an AStat Retry signal or an AResp Retry signal, as is appropriate. These signals from individual comparisons are combined on a per node basis inside the node controller. A decision to postpone gets the highest priority, so even a single comparison calling for postponement wins and results in the node voting to postpone the transaction. Only if all comparisons within a node vote to allow the current snoop to complete does the node decide to let the transaction complete.

The combined AStat Retry and AResp Retry signals are encoded by the node controller into the AStat Retry and ARespRetry codes and are submitted to the RCB for participation in the global AStat and AResp windows of the transaction being snooped. During these windows, responses from all the devices, other than the device that issued the transaction, and node controllers are combined by the RCB to produce a global response which is returned to all the participants, as explained with respect to FIGS. 10A–10D above. Again, at this global level, a retry response has the highest priority (barring an error code) and will be the final response if any of the input responses was a retry. The effect of a global retry response is cancellation of the current snoop of the transaction. Upon sensing a global retry response for the transaction, the node controller in which the transaction is registered either reissues the transaction for global snoop or retires the original transaction from which the said transaction was derived.

These global retries can be repeated until the correct order is achieved.

If, for any reason, a transaction receives a retry response, its snooped marking is reset, and it thus loses its present nominal position in the transaction order in the system. When it returns for snoop, the transaction gets a new position, according to the rule above. The mechanism does not necessarily prohibit the possibility of the reissued transaction being ordered behind another transaction that entered the system after it. If, on the other hand, the current transaction completes, it may cause other transactions to get retried.

Phases of a Transaction

Rather than using a common bus to connect processors, I/O agents, etc., the present invention uses node controllers to create a distributed SMP system. As noted previously, the achievement of coherence is distributed both in time and in space in the current system, i.e. across multiple cycles and multiple buses connected to multiple node controllers. With this architecture, timing paradoxes may arise among the transactions appearing on any given processor's bus.

A paradox may arise in the different perspectives of a transaction by a processor and its node controller. Specifically, a processor and its node controller may have different perspectives with respect to the order of initiation of transactions that appear on the processor's bus. If a first processor issues a first transaction to the system, and a second processor then issues a second transaction to the system, the first processor's view of the order of the two transactions will be consistent with that of the rest of the system, whether or not the first transaction is snooped before the second transaction. This is so because the first processor correctly views its transaction as having been issued before the second transaction.

However, if the processor issues a transaction that precedes by one cycle a transaction issued by the node controller, the processor may view its own transaction as having originated ahead of the transaction issued by the node controller. In actuality, the latter transaction, as viewed by the system, would have entered the system several cycles before the former transaction. The inconsistency in the two perspectives of the transaction order causes the coherency response of the processor to be incorrect from the perspective of the system if the two transactions do collide. The node controller must account for the differing perspectives, and it adjusts its own responses accordingly to resolve the ordering paradox.

In order to organize a node controller's coherence actions, the life of a transaction is divided into multiple phases depending on the type of transaction. A transaction is viewed as being active from the point at which it is accepted by a node controller to the point at which it is completed from the perspective of the system. The coherence actions of a node controller with respect to the transaction are a function of the current phase of the transaction and of other colliding transactions.

With reference now to FIG. 11, a table shows the definition of phases of a transaction within the present system. The phases of a transaction are chronologically ordered from phase 1a to phase 5. The length of each phase, the determination of the beginning and ending of a phase, and the location of the transaction within the system or the action being performed on the transaction within the system are provided in the table.

Phase 1a is the first phase of a transaction, and this phase is primarily concerned with accepting a transaction at one of the ports of one of the node controllers. The length of phase 1a is a single cycle that begins and ends with the transaction located in the incoming boundary latch for a port. Referring to FIG. 6, Phase 1a consists of the cycle during which the transaction resides in one of the boundary latches IN_BLx, where x is the port ID that received the transaction, such as boundary latches 609–612.

Phase 1b is the next phase of a transaction, and this phase consists of the time period for the primary response window for the transaction being received by the node controller. The length of phase 1b depends upon the type of the transaction being received. The phase begins with the second cycle of the transaction within the system, and the phase ends with the last cycle with which a Primary Address Response Out can be influenced for the transaction by the node controller. During this phase, the transaction is processed within the node controller that received the transaction into the system, and the node controller queues the transaction while determining the appropriate Primary Response to be delivered to the master device that issued the transaction. As was previously described above, all transactions are sorted into two categories depending upon whether the global coherence response for the transaction may or may not be delivered within the Primary Response window. During phase 1b, the node controller determines whether a global coherence response may be provided to the issuing entity in the Primary Response window.

Phase 2a is the next phase of a transaction, and this phase is concerned with the time period during which the transaction resides in a node controller while awaiting its broadcast for a global snoop. The length of the phase is indeterminate. The phase begins with the cycle after phase 1b has expired, and the phase ends with the cycle before the transaction is received by the node controller for a global snoop of the transaction. During this phase, the transaction is queued in the node controller and selected for broadcast for a global snoop. The length of the phase is indeterminate as the state of the overall system influences when the transaction will be selected for global snoop. The phase would be extremely short if it were the only transaction queued within any of the node controllers. If the system is experiencing a heavy load, the transaction may wait a significant number of cycles before it is selected to be snooped. Referring to FIG. 4, phase 2a concerns the time period in which a transaction may reside within a node controller, such as node controller 415, until the transaction is selected to be broadcast to the other components in the system. Hence, phase 2a includes those cycles during which the transaction passes through the address switch, such as when a transaction is sent via bus 416 to address switch 430 and forwarded via bus 417 and other buses to other parts of the system.

Phase 2b is the next phase of a transaction, and this phase is concerned with the cycle during which the transaction is received by the node controller for a global snoop. The length of the phase is a single cycle, and the phase begins and ends with the cycle during which the transaction is in the boundary latch FROM_ASX_BL. Referring to FIG. 6, phase 2b is the cycle during which the transaction has been broadcast to the node controllers and latched within boundary latch 627, also termed boundary latch FROM_ASX_BL. As previously described above, a unique transaction is latched in FROM_ASX_BL at all node controllers at any one time. Only one transaction can be in phase 2b. This property is used to define the relative order of transactions to be completed within the system. When a transaction reaches this phase, it is referred to as a "snooped transaction," and the node controller in which the transaction is registered marks the transaction as being snooped. When a transaction is in this phase, it undergoes global collision detection by determining whether it collides with any of the other transactions currently active in any of the node controllers of the system. The results of these collisions are combined during the appropriate cycle by the response combination block to produce a global response, both AStat and AResp, for the transaction.

Phase 3 is the next phase of a transaction, and this phase is concerned with the time period during which the transaction passes through the node controllers and is broadcast to the master devices for global snoop. The length of the phase is a fixed number of cycles dependent upon the system implementation, i.e. the number of cycles between the snoop latch and a port within the node controller implementation. The phase begins with the cycle after which phase 2b has expired, and the phase ends when the node controller senses the Global Address Response In for the transaction. During this phase, the transaction is snooped by the master devices connected to the node controllers. Referring to FIG. 6, phase 3 includes the cycles during which the transaction moves from the boundary latch FROM_ASX_BL to the ports of a node controller to be broadcast on the buses connected to the node controller. Phase 3 also includes those cycles during which the master devices produce responses that are combined by the response combination block to produce a global response for the snooped transaction.

Phase 4 is the next phase of a transaction, and this phase is concerned with processing that occurs before the completion of the transaction. Phase 4 may be described with respect to two categories of transactions: read transactions; and all other transactions except read transactions. The length of the phase depends on the type of the transaction. The phase begins with the cycle after phase 3 has expired, and the phase ends at a point which depends upon the category of the transaction. For read transactions, the phase ends with the cycle before the data transfer begins to the requester. For non-read transactions, the phase ends with the completion of the transaction with respect to the system.

Phase 5 is the next phase of a transaction, and this phase is concerned with the completion of read transactions. As noted above with respect to phase 4, the completion of transactions may be categorized into read transactions and non-read transactions. For non-read transactions, phase 4 is the final phase of a transaction. Phase 5 is defined only for read transactions, and the length of phase 5 depends on the type of read transaction and the amount of data to be transferred for the read transaction. The phase begins with the cycle after phase 4 has expired, and the phase ends with the completion of the read transaction with respect to the system.

Types of Transactions

Transactions are categorized for collision detection purposes based on the following: the transaction's possible final global coherency response; when the final global coherency response can be delivered to the masters who issued them; and the transaction type. The following categories are used in the determination of the global coherency response:

Read commands for which the coherency state of the cache line is reported along with data;

Read commands for which the coherency response is guaranteed to be Null;

Read commands for which a primary response of Rerun is given;

Command that must actually be snooped globally and for which the global response cannot be predicted, such as DClaim and RWITM transactions of the 6XX protocol;

Commands other than Reads for which the final global coherency can be predicted to be Null, such as Clean, DKill, Flush, etc.;

Non-coherent Writes which are not actively snooped by the masters, such as WWC/WWK M=0;

Coherent Writes, such as WWK/WWF M=1; and

Other miscellaneous commands that are not subject to coherency-related collisions, such as SYNC and TLBIE.

Node Controller Coherency Actions

The primary and global coherency responses contributed by the node controller for a transaction registered or queued within the node controller, i.e. local to the node controller, in collision with a snooped transaction are a function of the following conditions: the type and phase of the local transaction, and AStat and AResp responses that the transaction has received up to the time at which the node controller contributes its response; the type of the snooped transaction; the temporal proximity of the snooped transaction to other snooped transactions; and the bus protocol being implemented in the system.

For each unique pairing of colliding transactions within a node controller, the node controller contributes inputs, i.e. AStat and AResp responses, to the response determined by the response combination block. For example, for the 6XX protocol, AStat responses might be either Null, Ack, or Retry, and AResp responses might be either Null, Shared, or Retry. In addition, for each unique pairing of colliding transactions, the AResp responses may be conditional or unconditional. Hence, for each unique pair of colliding transactions, each node controller determines its response, which may include the use of conditional rules to be applied to the response determination.

With reference now to FIGS. 12A–12B, a table depicts responses generated by a node controller in response to the detection of a colliding pair of transactions.

FIG. 12A shows a table of responses for a colliding pair of a DClaim transaction and a Read transaction, for which the coherency state of the cache line is reported along with data, that would be produced by a node controller. "X" in the table denotes that the node controller does not contribute an "adverse" response for the transaction for this collision, e.g., in the 6XX protocol, the node controller contributes a Null response and not a Retry. In this example, the DClaim is a local transaction, i.e. a transaction which has been received, queued, or registered within the node controller, and the Read transaction is a transaction which is being snooped, i.e. resides in the FROM_ASX_BL boundary latch of the node controller and is in phase 2b with respect to the node controller in which it is registered.

Phase 1a and phase 1b denote the phases that lie within the Primary Response window. Hence, the node controller contributes a Null response to the snooped transaction in these phases. In Phase 2a, the local transaction or the global transaction may receive a contribution to its Global Response. Phase 2b is always represented by an empty column in a response table because the snooped transaction is always in Phase 2b, i.e. always resides in the FROM_ASX_BL boundary latch, and since only one transaction in the system may be in this state at any given time, the local transaction and the snooped transaction may not collide with itself. In phase 3 and phase 4, the snooped transaction may receive a contribution to its Global Response as the local transaction is relatively close to completion.

Referring again to FIG. 12A, if the node controller has a DClaim transaction in phase 1a and receives a Read transaction to be snooped, then the node controller contributes a Primary AStat Retry for the DClaim transaction. However, the Primary AResp response for the DClaim transaction is unaffected with respect to the node controller in which the DClaim transaction is registered. Neither the Global AStat nor AResp responses for the Read transaction are affected by the collision. If the node controller has a DClaim transaction in phase 1b and receives a Read transaction to be snooped, then the node controller does not contribute a Primary AStat response for the DClaim transaction. However, the Primary AResp response for the DClaim transaction receives a Retry from the node controller in which the DClaim transaction is registered. Again, neither the Global AStat nor AResp responses for the Read transaction are affected by the collision.

If the node controller has a DClaim transaction in phase 2a and receives a Read transaction to be snooped, the Global AResp response for the DClaim transaction receives a Retry from the node controller in which the DClaim transaction is registered. This particular response is termed a "self-retry". As phase 2a of a transaction represents the time period in which the transaction is queued within its local node controller, this response is stored with the local node controller for subsequent use. In this example, when the DClaim transaction is later presented for global snoop, its local node controller will issue the stored self-retry response at the appropriate time. Although the Read transaction with which the DClaim transaction collides may have already completed a significant time period before the DClaim transaction is presented for global snoop, the DClaim "loses" in this particular collision scenario as the noted response is necessary to ensure the proper order of the completion of transactions for maintaining cache coherency.

If the node controller has a DClaim transaction in phase 3 and receives a Read transaction to be snooped, the Global AResp response for the Read transaction may receive a Retry from the node controller in which the DClaim transaction is registered. This Retry is conditional on the progress of the colliding DClaim transaction. If the DClaim transaction does not receive a Global Retry, then the Read transaction does receive a Retry from the node controller in which the colliding DClaim transaction is registered, as shown in the table. If the DClaim transaction does receive a Global Retry, then the Read transaction receives a Null response from the node controller in which the colliding DClaim transaction is registered, i.e. the Retry in the table is converted to a Null.

If the node controller has a DClaim transaction in phase 4 and receives a Read transaction to be snooped, the Global AResp response for the Read transaction receives a Retry from the node controller in which the DClaim transaction is registered, as shown in the table. This Retry is unconditional on the progress of the colliding DClaim transaction.

FIG. 12B shows a table of responses that would be produced by a node controller for a colliding pair of DClaim and Read transactions. Again, "X" in the table denotes that the node controller does not contribute an "adverse" response for the transaction for this collision, e.g., in the 6XX protocol, the node controller contributes a Null response and not a Retry. In this example, in contrast to FIG. 12A, the Read is a local transaction, i.e. a transaction which has been received, queued, or registered within the node controller, and the DClaim transaction is a transaction which is being snooped, i.e. resides in the FROM_ASX_BL boundary latch of the node controller and is in phase 2b with respect to the node controller in which it is registered.

Referring again to FIG. 12B, if the node controller has a Read transaction in phase 1a and receives a DClaim transaction to be snooped, then the node controller contributes a Primary AStat Retry for the Read transaction. However, the Primary AResp response for the Read transaction is unaffected with respect to the node controller in which the Read transaction is registered. Neither the Global AStat nor AResp responses for the DClaim transaction are affected by the collision. If the node controller has a Read transaction in phase 2a and receives a DClaim transaction to be snooped, then the node controller does not contribute "adverse" Global AStat nor AResp responses for the Read transaction. However, the Global AStat response for the DClaim transaction is not affected by the collision, but the Global AResp response for the DClaim transaction receives a Retry from the node controller.

If the node controller has a Read transaction in phase 3 or phase 4 and receives a DClaim transaction to be snooped, then the node controller does not contribute "adverse" Global AStat nor AResp responses for the Read transaction. However, the Global AStat response for the DClaim transaction is not affected by the collision, but the Global AResp response for the DClaim transaction receives a Retry from the node controller in either case. These Retries are unconditional in both cases.

By comparing the tables in FIG. 12A and FIG. 12B, it may be observed that the tables are not mirror images of each other, i.e. the pattern of responses are not necessarily symmetrical for a pair of colliding transactions. Such responses may be precomputed and encoded, and these codes may be stored in a ROM as part of a microprogram. When a collision occurs, the appropriate microword can be accessed to regenerate the necessary responses. Alternatively, the responses may be hardcoded using logic gates.

The advantages of the present invention should be apparent in view of the detailed description provided above. The present invention allows scaling of a standardized and easier-to-verify bus-based cache-coherence protocols to a large-way, multiprocessor system whose large size normally would make physical buses inefficient media for communication among system components, such as processors, memory subsystems, and I/O agents. By using the distributed system structure of the present invention, development of more complicated directory-based protocols, etc. are unnecessary. The present invention also allows component interfaces to be clocked faster than possible with a single bus, thereby enhancing the bandwidths of the component interfaces and resulting in higher total system bandwidth and performance. The present invention also supports multiple data buses, thereby multiplying the data bandwidth of the system and improving the efficiency of the processor. The data transfer parallelism of the present system also improves total system data throughput.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of maintaining cache coherency in a multiprocessor system, the method comprising the steps of:
  receiving a transaction at a node controller during a local cycle;
  broadcasting the transaction to master devices for a global snoop during a global cycle; and
  contributing one or more inputs into a determination of a coherency response for the transaction.

2. The method of claim 1 further comprising:
  providing the coherency response to a requester of the transaction in a primary response window of the transaction.

3. The method of claim 1 further comprising:
  providing the coherency response to a requester of the transaction in a global response window of the transaction.

4. The method of claim 3 wherein the coherency response was previously stored in response to a determination that the transaction collides with another transaction.

5. The method of claim 3 wherein the coherency response is conditional with respect to a completion of a colliding transaction.

6. The method of claim 3 wherein the coherency response is unconditional with respect to a completion of a colliding transaction.

7. The method of claim 1 further comprising:
  determining a contributed input for the coherency response according to one or more of the following conditions: a phase of the transaction; a transaction type of the transaction; a transaction type of a snooped transaction; and a bus protocol for communicating between the node controller and a requester of the transaction.

8. The method of claim 1 further comprising:
  determining a contributed input for the coherency response according to a phase of the transaction.

9. The method of claim 8 wherein a phase of the transaction is determinable by the node controller as one of a plurality of phases.

10. The method of claim 9 wherein one phase in the plurality of phases of the transaction is defined as a time period consisting of a first cycle for the transaction within the node controller.

11. The method of claim 9 wherein one phase in the plurality of phases of the transaction is defined as a time period consisting of a second cycle for the transaction within the node controller to a last cycle for a primary response for the transaction.

12. The method of claim 9 wherein one phase in the plurality of phases of the transaction is defined as a time period consisting of a first cycle after a preceding phase until a last cycle before the node controller receives the transaction as a snooped transaction.

13. The method of claim 9 wherein one phase in the plurality of phases of the transaction is defined as a time period consisting of a first cycle in which the node controller receives the transaction as a snooped transaction.

14. The method of claim 9 wherein one phase in the plurality of phases of the transaction is defined as a time period consisting of a first cycle after a preceding phase until a global coherency response is received by the node controller for the transaction.

15. The method of claim 9 wherein one phase in the plurality of phases of the transaction is defined as a time period consisting of a first cycle after a preceding phase until the transaction completes.

16. The method of claim 9 wherein, if the transaction is a read transaction, one phase in the plurality of phases of the transaction is defined as a time period consisting of a first cycle after a preceding phase until a first cycle for transferring data to a requester of the transaction.

17. The method of claim 1 wherein the coherency response of the transaction is generated by a response combination block.

18. The method of claim 1 further comprising:
  registering the received transaction in the node controller.

19. The method of claim 1 wherein the multiprocessor system comprises:
  the node controller;
  a plurality of master devices; and
  a plurality of bidirectional master device buses, wherein each bidirectional master device bus connects one or more master devices within a node to a port of the node controller.

20. The method of claim 19 wherein the node controller comprises:
  a plurality of master device ports, wherein each master device port connects to a master device bus;
  a pair of address switch ports, wherein each address switch port connects to one of a pair of unidirectonal address switch buses, wherein one of the pair of address switch buses conveys an address from the node controller to the address switch and the other of the pair of address switch buses conveys an address from the address switch to the node controller; and
  a plurality of memory subsystem ports, wherein each memory subsystem port connects to one of a plurality of bidirectional memory subsystem buses, wherein each bidirectional memory subsystem bus conveys data between the node controller and one of a plurality of memory subsystems.

21. A method of maintaining cache coherency in a multiprocessor system, the method comprising the steps of:
  receiving a transaction at a node controller during a local cycle;
  determining whether it is possible to predict a global coherence response;
  predicting a global coherence response if it is possible to predict the global coherence response; and
  providing the predicted global coherence response to a requester of the transaction in a primary response window for the transaction.

22. The method of claim 21, further comprising:
  delivering a primary response that indicates postponement of a global coherence response to a requester of the transaction in a primary response window for the transaction if it is not possible to predict the global coherence response.

23. A multiprocessor system, comprising:
  a node controller;
  a plurality of master devices; and
  a plurality of bidirectional master device buses, wherein each bidirectional master device bus connects one or more master devices within a node to a port of the node controller.

24. The multiprocessor of claim 23 wherein the node controller comprises:
  a plurality of master device ports, wherein each master device port connects to a master device bus;
  a pair of address switch ports, wherein each address switch port connects to one of a pair of unidirectional address switch buses, wherein one of the pair of address switch buses conveys an address from the node controller to the address switch and the other of the pair of address switch buses conveys an address from the address switch to the node controller; and a plurality of memory subsystem ports, wherein each memory subsystem port connects to one of a plurality of bidirectional memory subsystem buses, wherein each bidirectional memory subsystem bus conveys data between the node controller and one of a plurality of memory subsystems.

25. A node controller, comprising:

a plurality of master device ports, wherein each master device port connects to a master device bus;

a pair of address switch ports, wherein each address switch port connects to one of a pair of unidirectional address switch buses, wherein one of the pair of address switch buses conveys an address from the node controller to the address switch and the other of the pair of address switch buses conveys an address from the address switch to the node controller; and a plurality of memory subsystem ports, wherein each memory subsystem port connects to one of a plurality of bidirectional memory subsystem buses, wherein each bidirectional memory subsystem bus conveys data between the node controller and one of a plurality of memory subsystems.

* * * * *

UNITED STATES PATENT AND TRADEMARK OFFICE
CERTIFICATE OF CORRECTION

PATENT NO. : 6,591,348 B1
DATED : July 8, 2003
INVENTOR(S) : Deshpande et al.

Figure 9A:
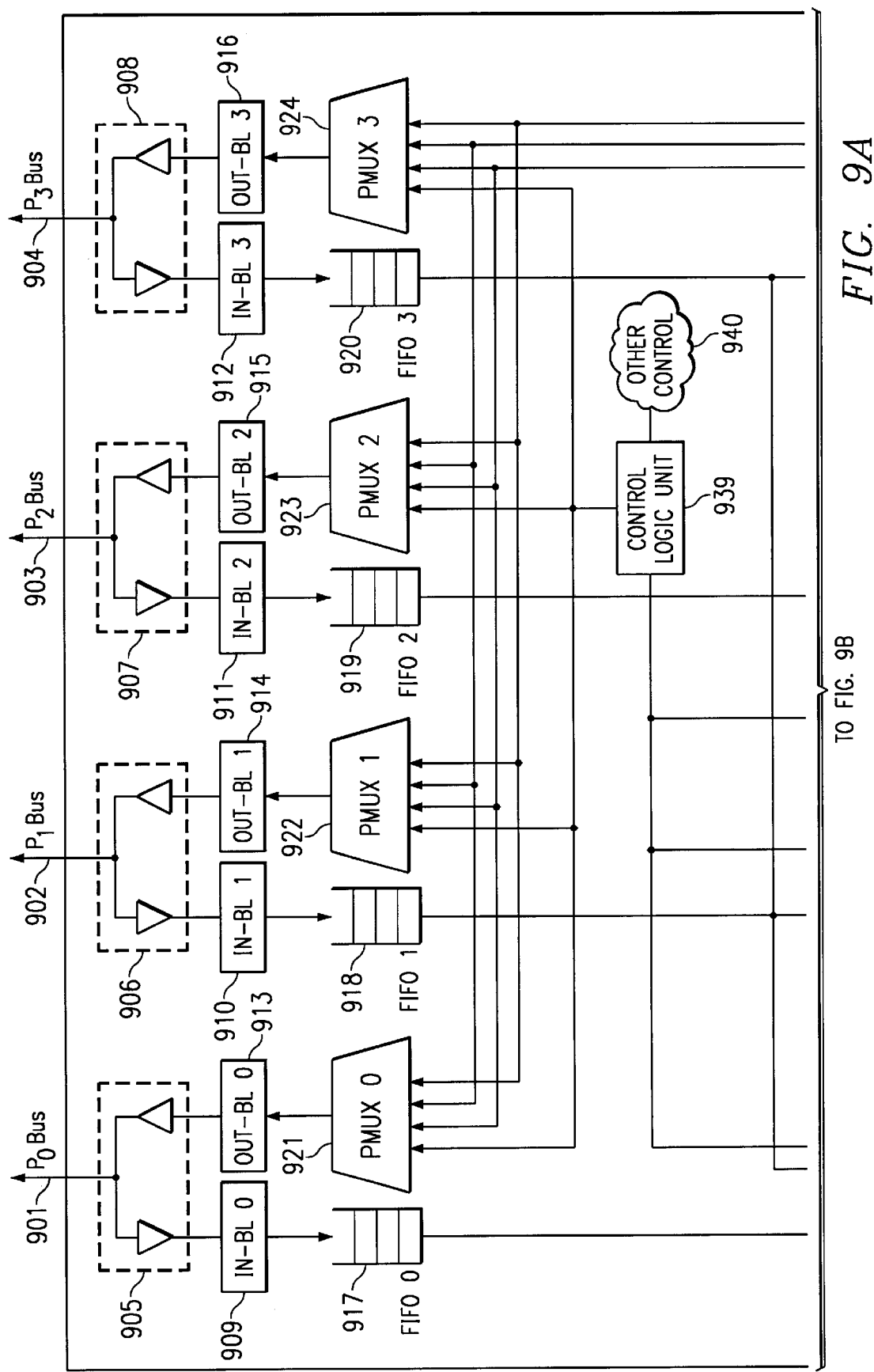
FIG. 9 is a block diagram depicting the data paths internal to a node controller.
Figure 9B:
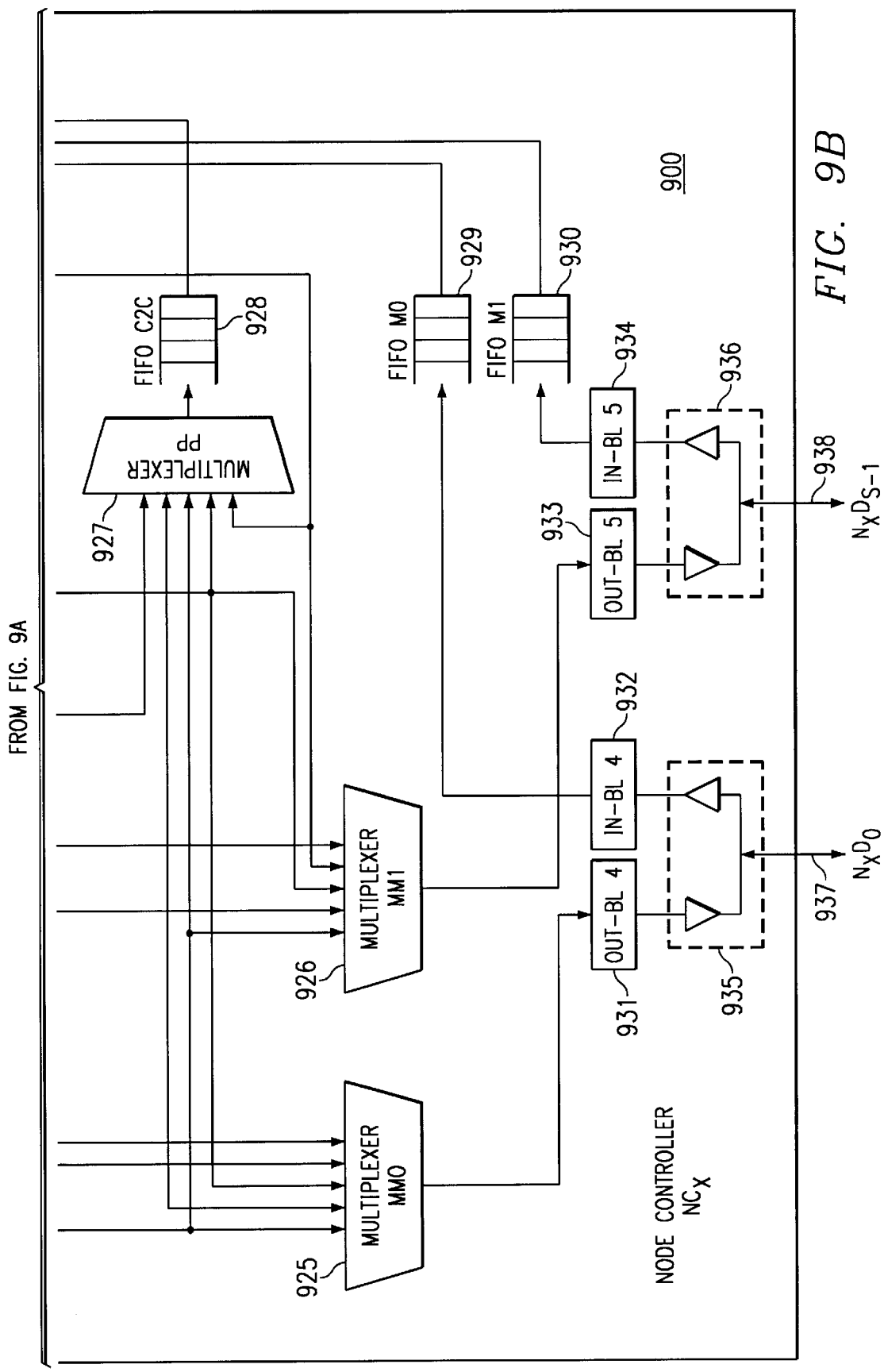

It is certified that error appears in the above-identified patent and that said Letters Patent is hereby corrected as shown below:

Column 1,
Lines 14, 18 and 23, after "filed on", delete "Sep. 9, 1999" and insert -- July 8, 1999 --;
Line 33,
after "Sep. 23," delete "1998" and insert --1999; "METHOD AND APPARATUS TO DISTRIBUTE INTERRUPTS TO MULTIPLE INTERRUPT HANDLERS IN A DISTRIBUTED SYMMETRIC MULTIPROCESSOR SYSTEM", U.S. Application Serial Number 09/436,201, Attorney Docket Number AT9-99-646, filed on 11/08/99; "METHOD AND APPARATUS TO ELIMINATE FAILED SNOOPS OF TRANSACTIONS CAUSED BY BUS TIMING CONFLICTS IN A DISTRIBUTED SYMMETRIC MULTIPROCESSOR SYSTEM", U.S. Application Serial Number 09/436,203, Attorney Docket Number AT9-99-647, filed on 11/08/99; "METHOD AND APPARATUS FOR TRANSACTION PACING TO REDUCE DESTRUCTIVE INTERFERENCE BETWEEN SUCCESSIVE TRANSACTIONS IN A DISTRIBUTED SYMMETRIC MULTIPROCESSOR SYSTEM", U.S. Application Serial Number 09/436,203, Attorney Docket Number AT9-99-648, filed on 11/08/99; "METHOD AND APPARATUS FOR INCREASED PERFORMANCE OF A PARKED DATA BUS IN THE NON-PARKED DIRECTION", U.S. Application Serial Number 09/436,206, Attorney Docket Number AT9-99-649, filed on 11/08/99; "METHOD AND APPARATUS FOR FAIR DATA BUS PARKING PROTOCOL WITHOUT DATA BUFFER RESERVATIONS AT THE RECEIVER", U.S. Application Serial Number 09/436,202, Attorney Docket Number AT9-99-650, filed on 11/08/99; "METHOD AND APPARATUS FOR AVOIDING DATA BUS GRANT STARVATION IN A NON-FAIR, PRIORITIZED ARBITER FOR A SPLIT BUS SYSTEM WITH INDEPENDENT ADDRESS AND DATA BUS GRANTS", U.S. Application Serial Number 09/436,200, Attorney Docket Number AT9-99-651, filed on 11/08/99; "METHOD AND APPARATUS FOR SYNCHRONIZING MULTIPLE BUS ARBITERS ON SEPARATE CHIPS TO GIVE SIMULTANEOUS GRANTS FOR THE PURPOSE OF BREAKING LIVELOCKS", U.S. Application Serial Number 09/436,192, Attorney Docket Number AUS990836US1, filed on 11/08/99; "METHOD AND APPARATUS FOR TRANSACTION TAG ASSIGNMENT AND MAINTENANCE IN A DISTRIBUTED SYMMETRIC MULTIPROCESSOR SYSTEM", U.S. Application Serial Number 09/436,205, Attorney Docket Number AT9-99-652, filed on 11/08/99; and "METHOD AND APPARATUS FOR DATA BUS LATENCY REDUCTION USING TRANSFER SIZE PREDICTION FOR SPLIT BUS DESIGNS", U.S. Application Serial Number 09/434,764, Attorney Docket Number AT9-99-478, filed on 11/04/99; all of which are assigned to the same assignee.--;

Column 3,
Line 27, delete "FIG. 9 is a block diagram" and insert -- FIGS. 9A-9B are block diagrams --;

Column 9,
Line 42, delete "NN-1D0 and NN-1DS-1" and insert -- NN-1DS-1 and NN-1D0 --;

UNITED STATES PATENT AND TRADEMARK OFFICE
CERTIFICATE OF CORRECTION

PATENT NO.     : 6,591,348 B1
DATED          : July 8, 2003
INVENTOR(S)    : Deshpande et al.

It is certified that error appears in the above-identified patent and that said Letters Patent is hereby corrected as shown below:

<u>Column 12,</u>
Line 30, delete "Figure 9, a block diagram depicts" and insert -- Figures 9A-9B, block diagrams depict --;
Line 47, delete "FIG. 9" and insert -- FIGS. 9A-9B --;

<u>Column 16,</u>
Lines 47 and 64, after "snooped", delete "to" and insert -- by --;

<u>Column 18,</u>
Line 21, after "every", delete "other";

<u>Column 21,</u>
Line 24, after "and", delete "all other" and insert -- non-read --;
Line 24, after "transactions", delete "except read transactions".

Signed and Sealed this

Sixth Day of April, 2004

JON W. DUDAS
*Acting Director of the United States Patent and Trademark Office*